United States Patent
Hoshino et al.

(10) Patent No.: US 10,981,122 B2
(45) Date of Patent: Apr. 20, 2021

(54) MONOLAYER, COMPOSITE, GAS SEPARATION MATERIAL, FILTER, GAS SEPARATION DEVICE AND METHOD FOR MANUFACTURING COMPOSITE

(71) Applicant: KYUSHU UNIVERSITY, NATIONAL UNIVERSITY CORPORATION, Fukuoka (JP)

(72) Inventors: Yu Hoshino, Fukuoka (JP); Kazushi Imamura, Fukuoka (JP); Tomohiro Gyobu, Fukuoka (JP); Ikuo Taniguchi, Fukuoka (JP); Akira Hamasaki, Fukuoka (JP); Chie Yamashita, Fukuoka (JP); Takeshi Watanabe, Fukuoka (JP); Yoshiko Miura, Fukuoka (JP)

(73) Assignee: KYUSHU UNIVERSITY, NATIONAL UNIVERSITY CORPORATION, Fukuoka (JP)

(*) Notice: Subject to any disclaimer, the term of this patent is extended or adjusted under 35 U.S.C. 154(b) by 103 days.

(21) Appl. No.: 16/079,600

(22) PCT Filed: Feb. 24, 2017

(86) PCT No.: PCT/JP2017/007204
§ 371 (c)(1),
(2) Date: Aug. 24, 2018

(87) PCT Pub. No.: WO2017/146231
PCT Pub. Date: Aug. 31, 2017

(65) Prior Publication Data
US 2019/0083943 A1    Mar. 21, 2019

(30) Foreign Application Priority Data
Feb. 25, 2016 (JP) .............................. JP2016-034717

(51) Int. Cl.
*B01D 71/40* (2006.01)
*B01D 69/02* (2006.01)
(Continued)

(52) U.S. Cl.
CPC ........... *B01D 71/40* (2013.01); *B01D 53/228* (2013.01); *B01D 67/0006* (2013.01);
(Continued)

(58) Field of Classification Search
CPC .. B01D 53/228; B01D 53/62; B01D 67/0006; B01D 69/0069; B01D 69/0095;
(Continued)

(56) References Cited

U.S. PATENT DOCUMENTS

2003/0022954 A1* 1/2003 Masawaki .......... B01D 67/0006
521/99
2004/0007521 A1* 1/2004 Kurth .................... B01D 69/02
210/483

(Continued)

FOREIGN PATENT DOCUMENTS

EP    2745930 A1    6/2014
JP    07-060078     7/1995

(Continued)

OTHER PUBLICATIONS

Yue, Mengchen et al., "Temperature-Responsive Microgel Films as Reversible Carbon Dioxide Absorbents in Wet Environment", Angew. Chem., 2014, 126, pp. 2692-2695. (Year: 2014).*

(Continued)

*Primary Examiner* — Jason M Greene
(74) *Attorney, Agent, or Firm* — Browdy and Neimark, PLLC

(57) ABSTRACT

A monolayer membrane containing gelling polymer particles having at least one of a basic functional group and an acidic functional group, and having a thickness of less than (Continued)

5 μm. A composite having a porous carrier and gelling polymer particles having at least any one of a basic functional group and an acidic functional group and filling up the surface pores of the porous carrier. The invention can provide a novel material capable of efficiently separating an acid gas from a mixed gas.

14 Claims, 23 Drawing Sheets

(51) Int. Cl.
- B01D 69/12 (2006.01)
- C08J 7/04 (2020.01)
- C08J 5/20 (2006.01)
- B01D 67/00 (2006.01)
- B01D 71/76 (2006.01)
- B01D 69/10 (2006.01)
- B01D 53/22 (2006.01)
- B01D 69/04 (2006.01)
- B01D 71/26 (2006.01)
- B01D 71/34 (2006.01)
- B01D 71/36 (2006.01)
- B01D 71/68 (2006.01)
- B01D 69/06 (2006.01)
- C08J 5/22 (2006.01)

(52) U.S. Cl.
CPC ..... *B01D 67/0069* (2013.01); *B01D 67/0095* (2013.01); *B01D 69/02* (2013.01); *B01D 69/04* (2013.01); *B01D 69/10* (2013.01); *B01D 69/12* (2013.01); *B01D 69/125* (2013.01); *B01D 71/26* (2013.01); *B01D 71/34* (2013.01); *B01D 71/36* (2013.01); *B01D 71/68* (2013.01); *B01D 71/76* (2013.01); *C08J 5/20* (2013.01); *C08J 7/04* (2013.01); *B01D 69/06* (2013.01); *B01D 2256/10* (2013.01); *B01D 2257/504* (2013.01); *B01D 2323/12* (2013.01); *B01D 2323/16* (2013.01); *B01D 2323/30* (2013.01); *B01D 2325/028* (2013.01); *B01D 2325/12* (2013.01); *C08J 5/2206* (2013.01); *Y02E 50/30* (2013.01); *Y02P 20/151* (2015.11); *Y02P 20/50* (2015.11)

(58) Field of Classification Search
CPC ........ B01D 69/02; B01D 69/04; B01D 69/06; B01D 69/10; B01D 69/12; B01D 69/125; B01D 71/26; B01D 71/34; B01D 71/36; B01D 71/40; B01D 71/68; B01D 71/76; B01D 2257/504; B01D 2323/12; B01D 2323/16; B01D 2323/30
See application file for complete search history.

(56) References Cited

U.S. PATENT DOCUMENTS

| | | | |
|---|---|---|---|
| 2014/0294707 A1* | 10/2014 | Hoshino | B01D 53/62 423/220 |
| 2015/0013537 A1* | 1/2015 | Parrish | B01D 53/228 95/44 |
| 2017/0259245 A1* | 9/2017 | Hoshino | B01D 53/62 |

FOREIGN PATENT DOCUMENTS

| | | | |
|---|---|---|---|
| JP | 2006130453 | 5/2006 | |
| JP | 2010149026 | 7/2010 | |
| JP | 2012179514 | 9/2012 | |
| JP | 2013027806 | 2/2013 | |
| JP | 2014014808 | 1/2014 | |
| JP | 2014079745 | 5/2014 | |
| JP | 2015192927 | 11/2015 | |
| JP | 2016000402 | 1/2016 | |
| JP | 2016112563 | 6/2016 | |
| JP | 2016117045 | 6/2016 | |
| WO | 2015083766 | 6/2015 | |
| WO | 2015098518 | 7/2015 | |
| WO | 2016-024633 A1 | 2/2016 | |
| WO | WO 2016/024633 A1 * | 2/2016 | B01D 53/62 |

OTHER PUBLICATIONS

Extended European Search Report dated Sep. 20, 2019 issued in the corresponding European patent application No. 17756665.0.
Mengchen Yue et al: Angewandte Chemie, International Edition, vol. 53, No. 10, Jan. 22, 2014 (Jan. 22, 2014), pp. 2654-2657.
Mengchen Yue et al: Chemical Science, vol. 6, No. 11, Jul. 28, 2015 (Jul. 28, 2015), pp. 6112-6123.
International Preliminary Report on Patentability dated Aug. 28, 2018 for International application No. PCT/JP2017/007204, English and Japanese versions.
International Search Report dated Apr. 18, 2018 for International application No. PCT/JP2017/007204.
Office Action dated Feb. 15, 2021, in corresponding European patent application no. 17 756 665.0-1104.

* cited by examiner

[FIG. 1]
(a) 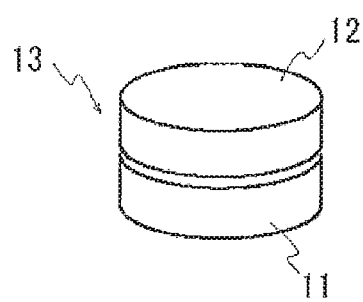
(b) 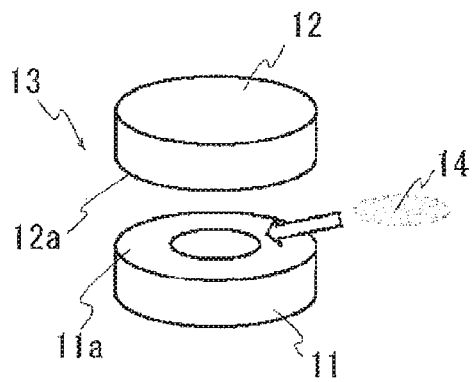
[FIG. 2]
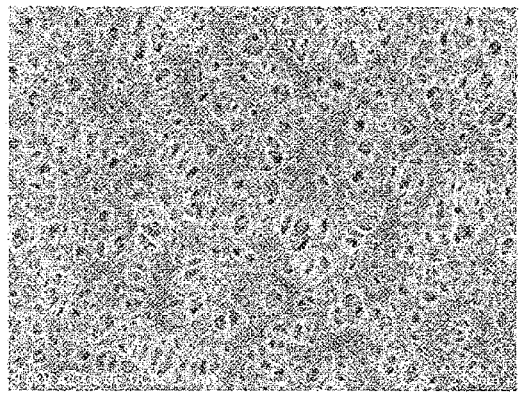
PES PORE SIZE 0.1 μm FRONT
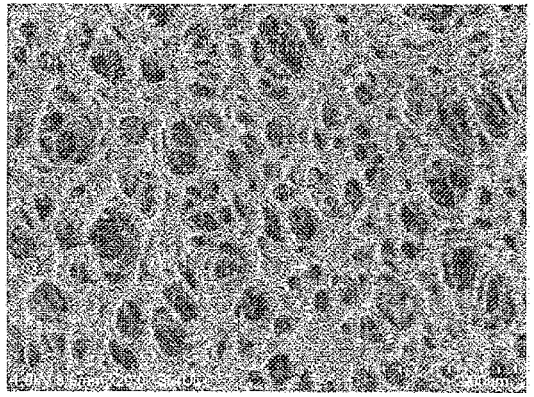
PES PORE SIZE 0.1 μm BACK
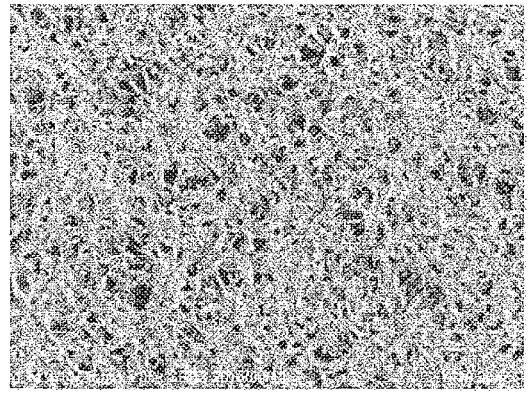
PVDF PORE SIZE 0.1 μm
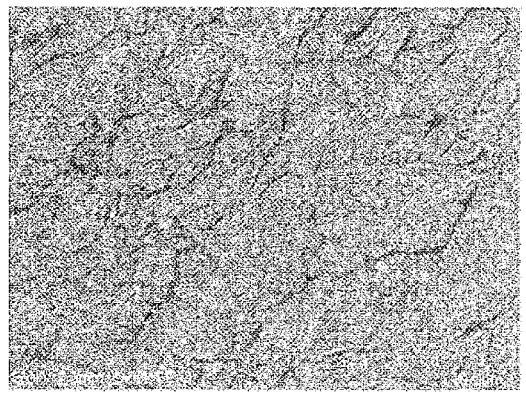
NC PORE SIZE 0.1 μm

[FIG. 3]
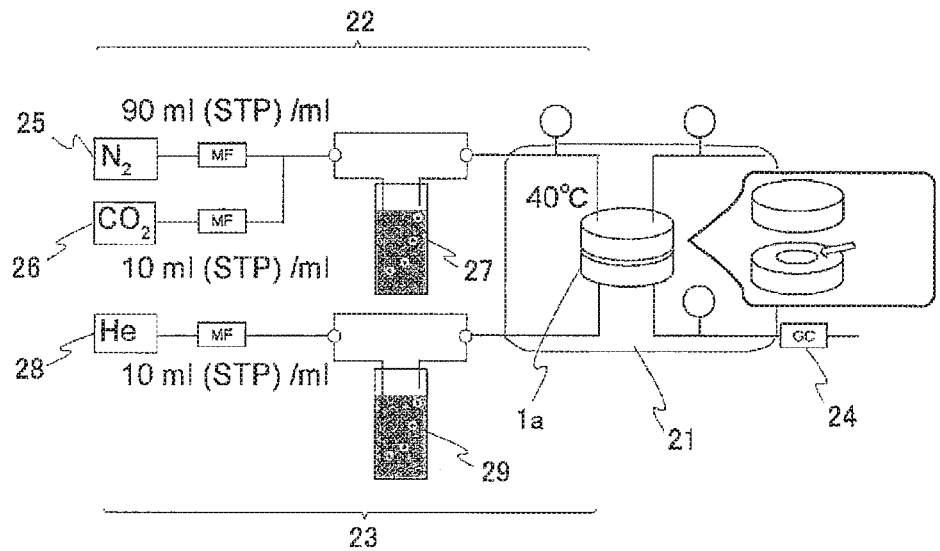
[FIG. 4]
PES PORE SIZE 0.1 μm
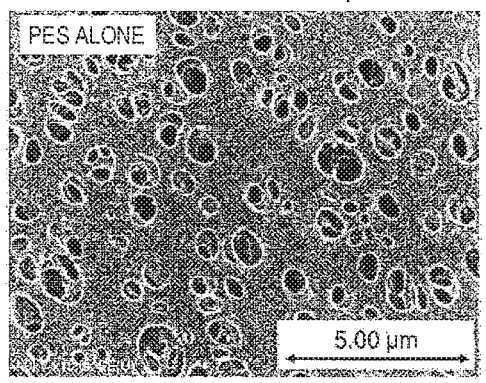
MEMBRANE CONTAINING GELLING POLYMER PARTICLES 1
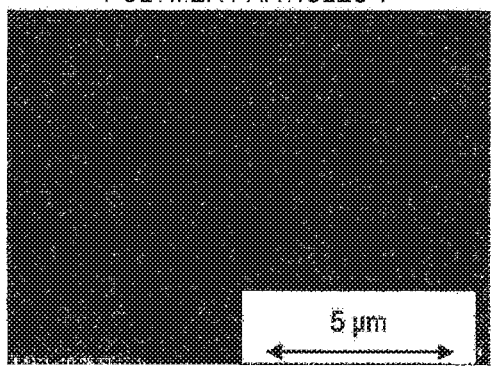
MEMBRANE CONTAINING LINEAR POLYMER
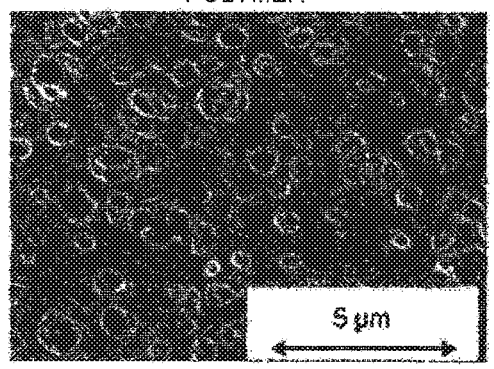

[FIG. 5]
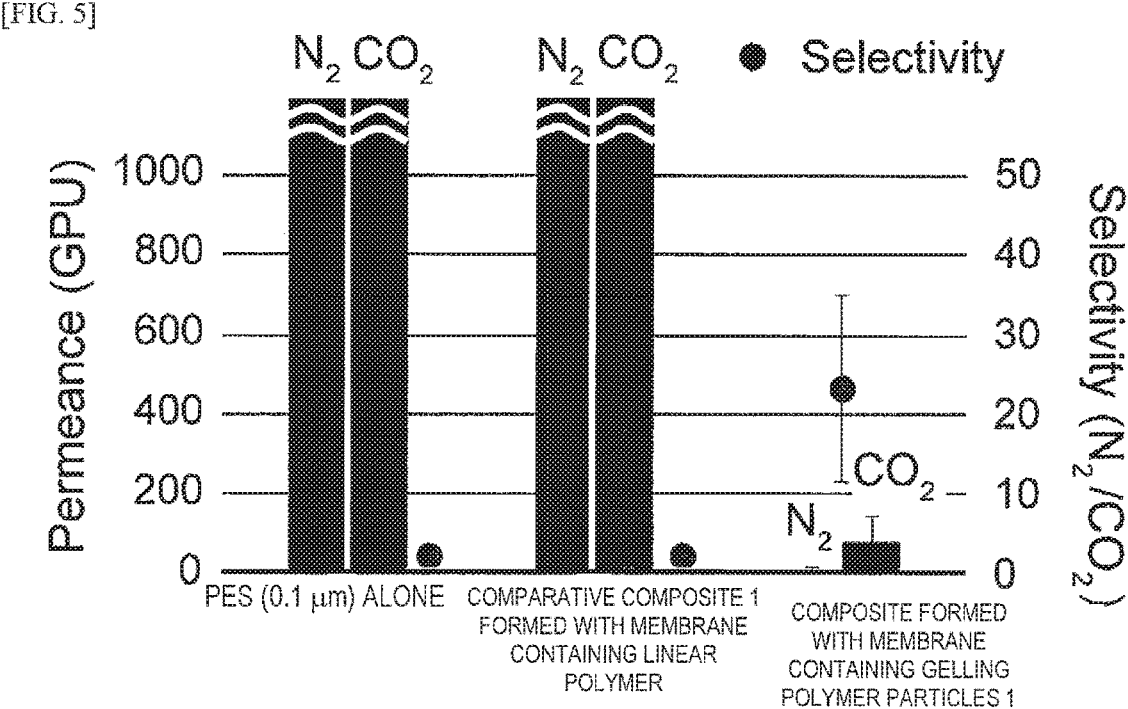
[FIG. 6]
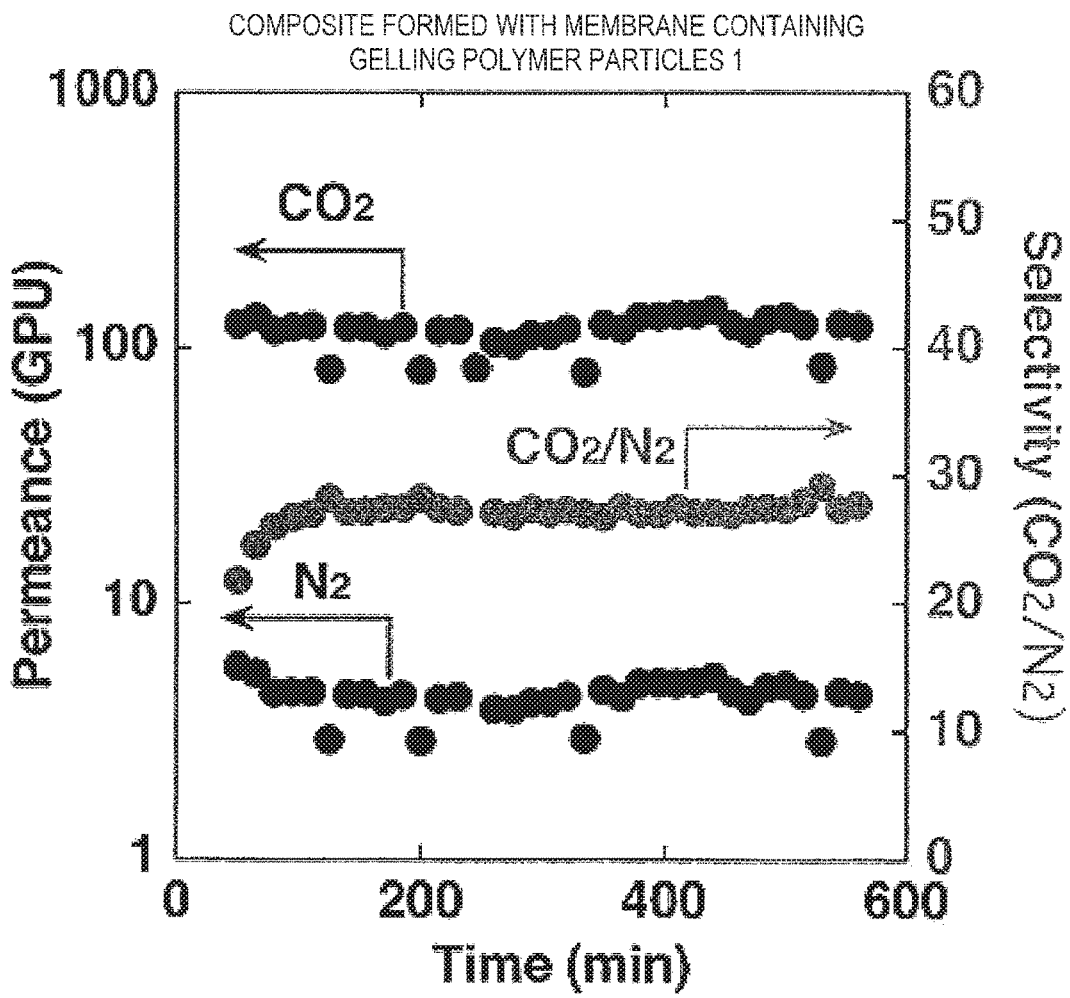

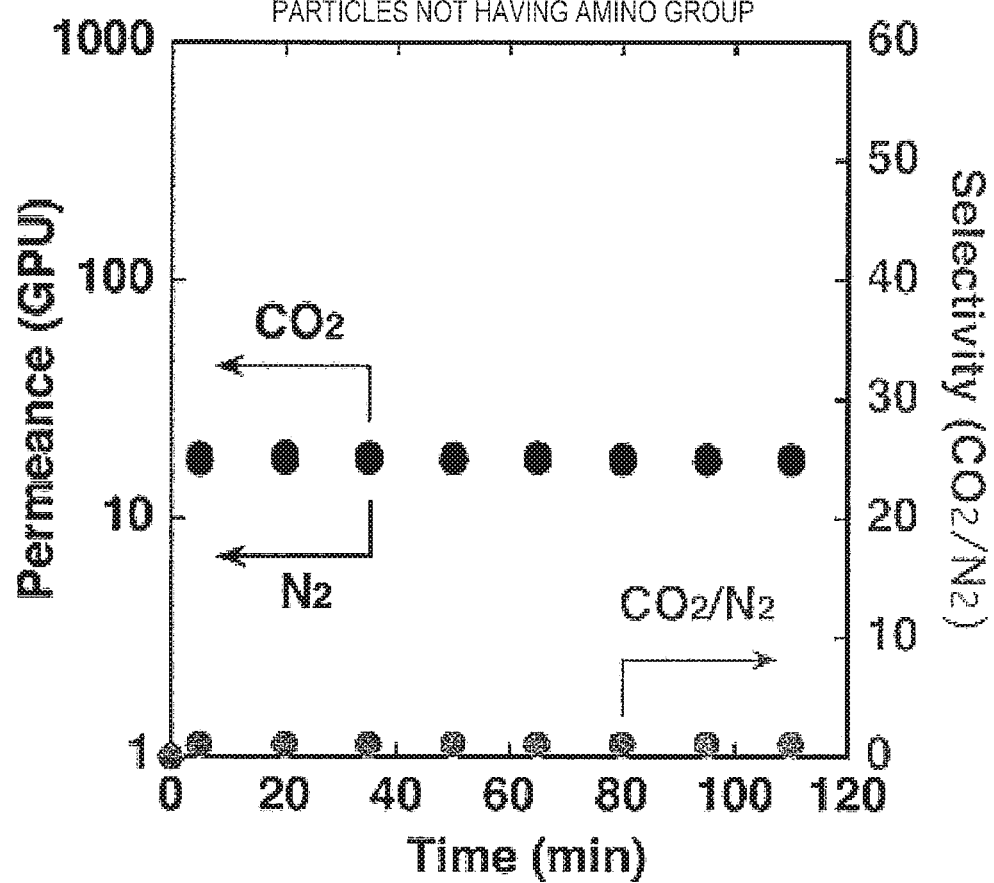
[FIG. 7]

[FIG. 8]
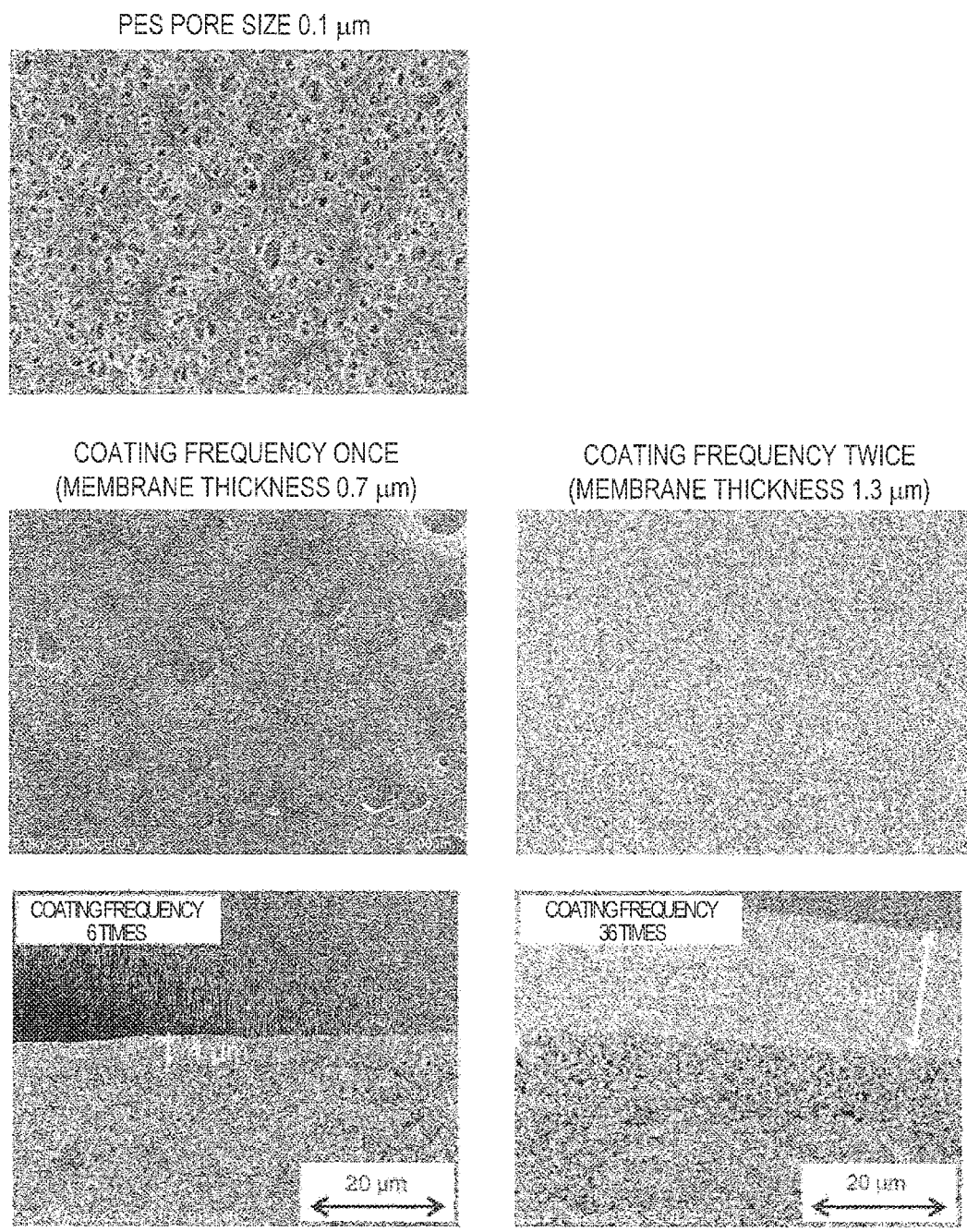

[FIG. 9]
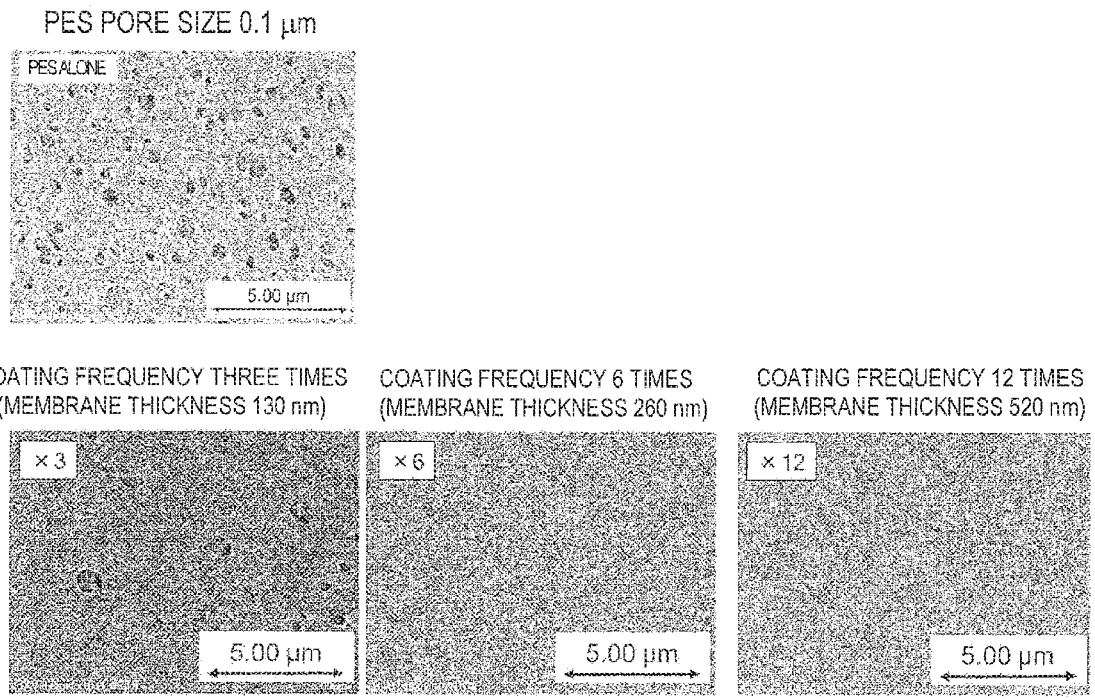
[FIG. 10]
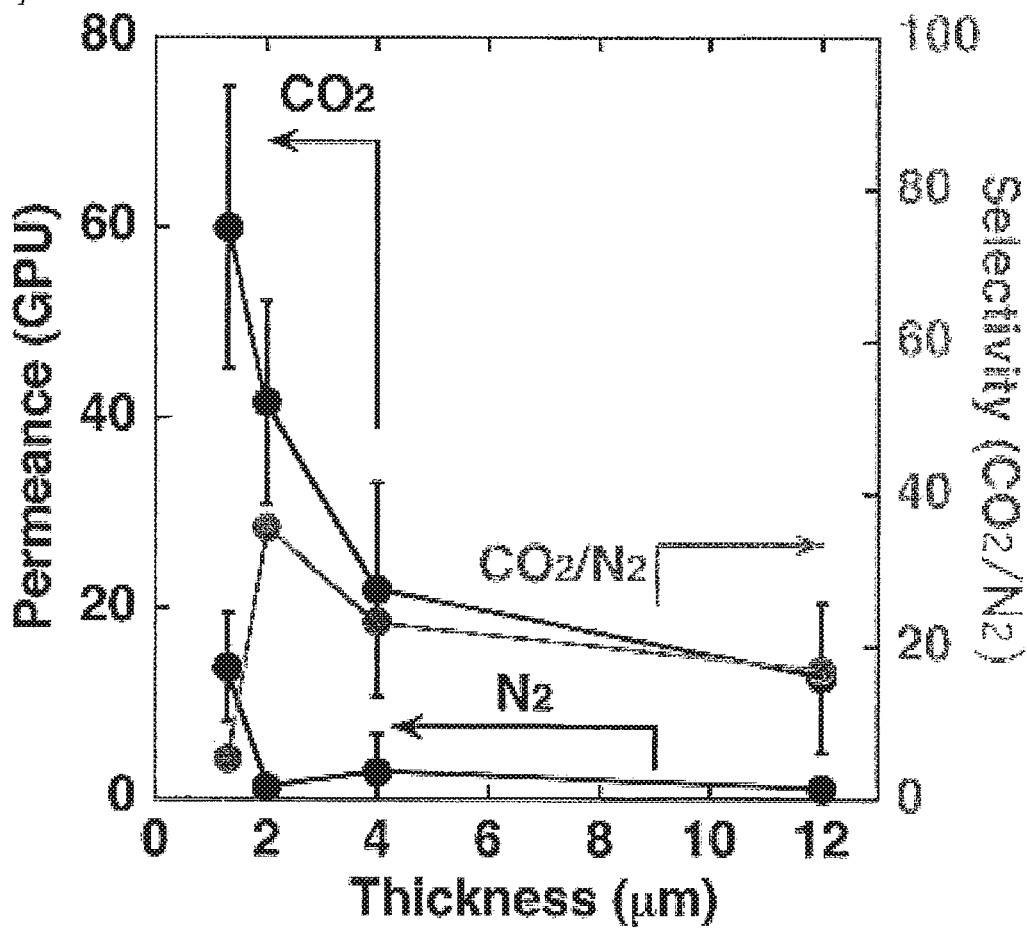

[FIG. 11]
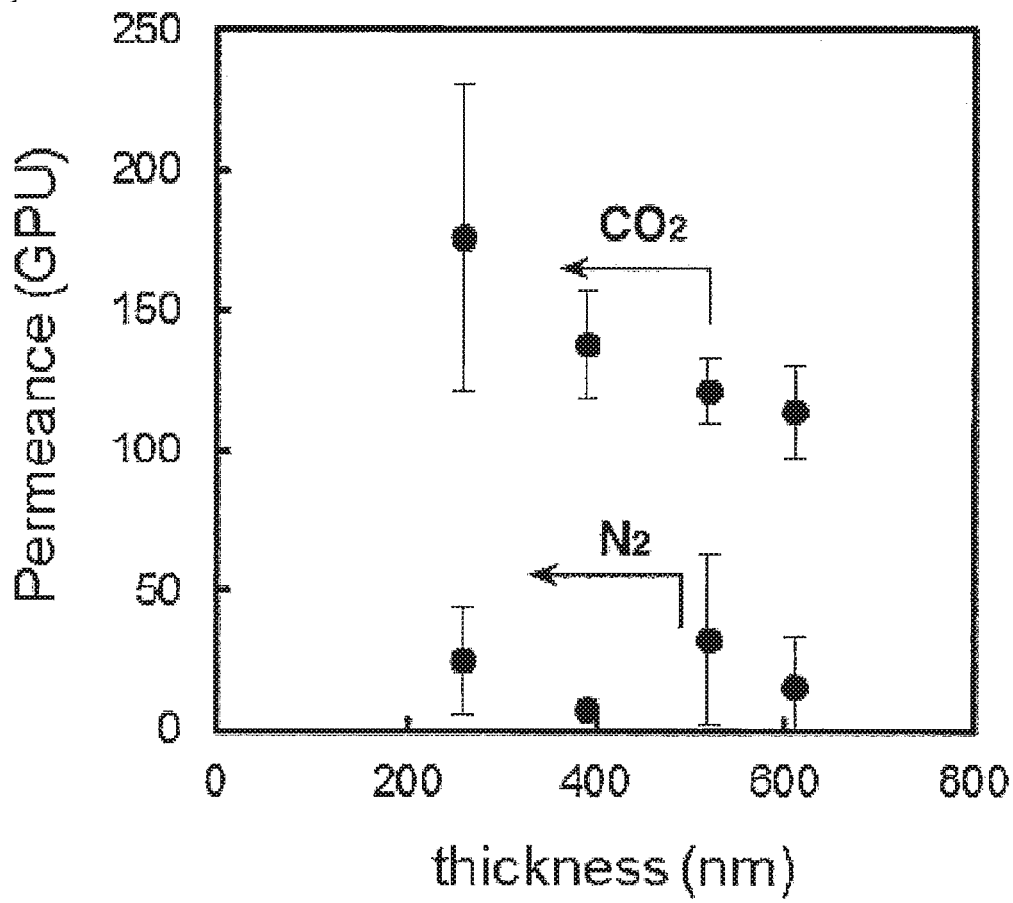
[FIG. 12]
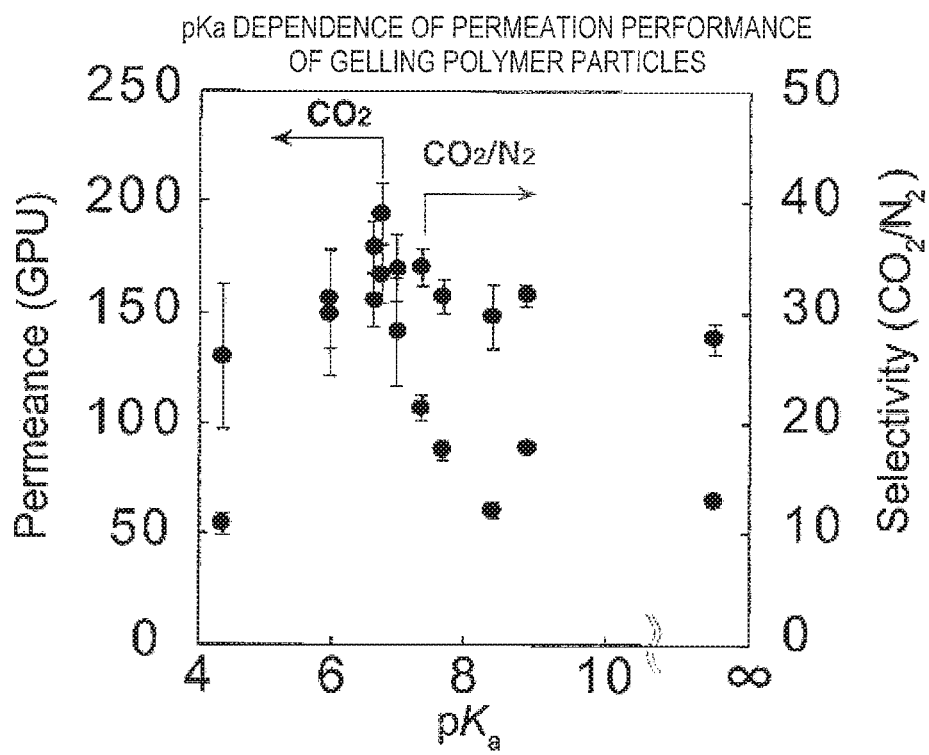

[FIG. 13]
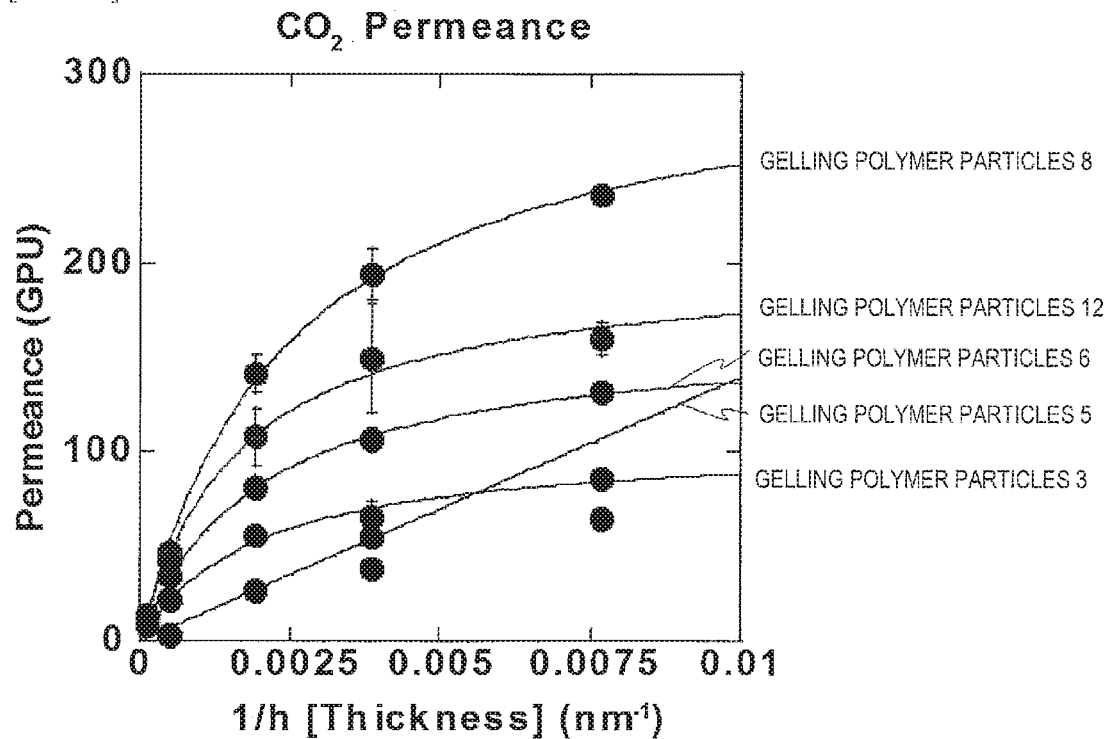
[FIG. 14]
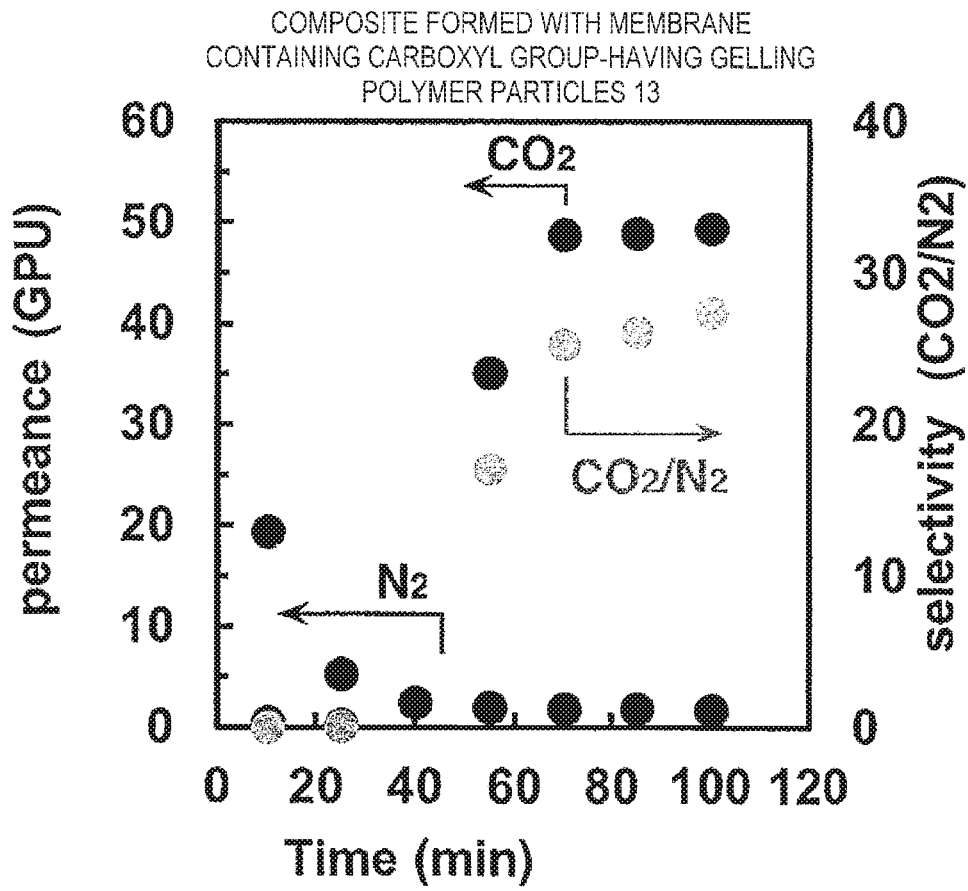

[FIG. 15]
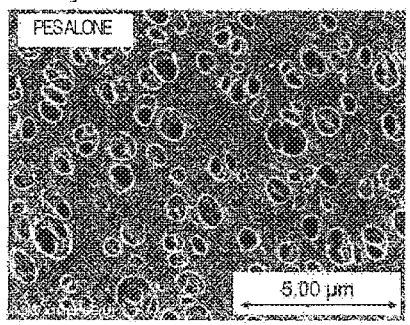
MEMBRANE CONTAINING GELLING POLYMER
PARTICLES 2 WITH PARTICLE SIZE 89 nm
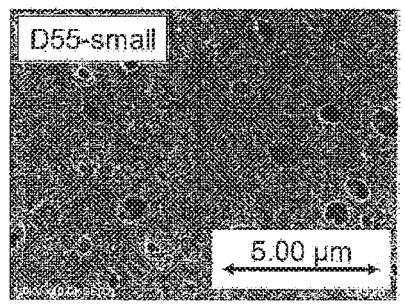
MEMBRANE CONTAINING GELLING POLYMER
PARTICLES 1 WITH PARTICLE SIZE 235 nm
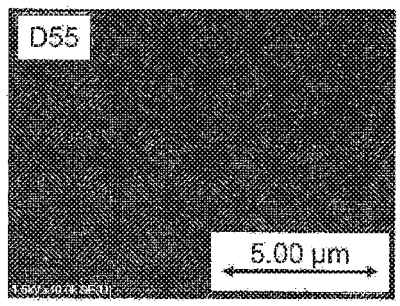
[FIG. 16]
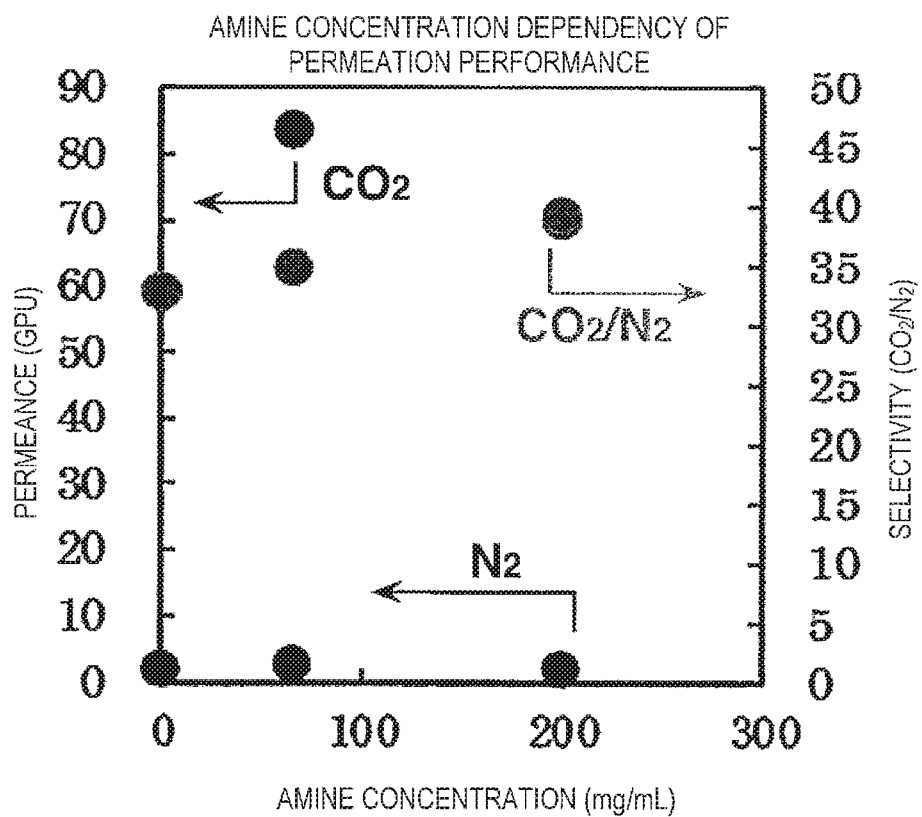

[FIG. 17]
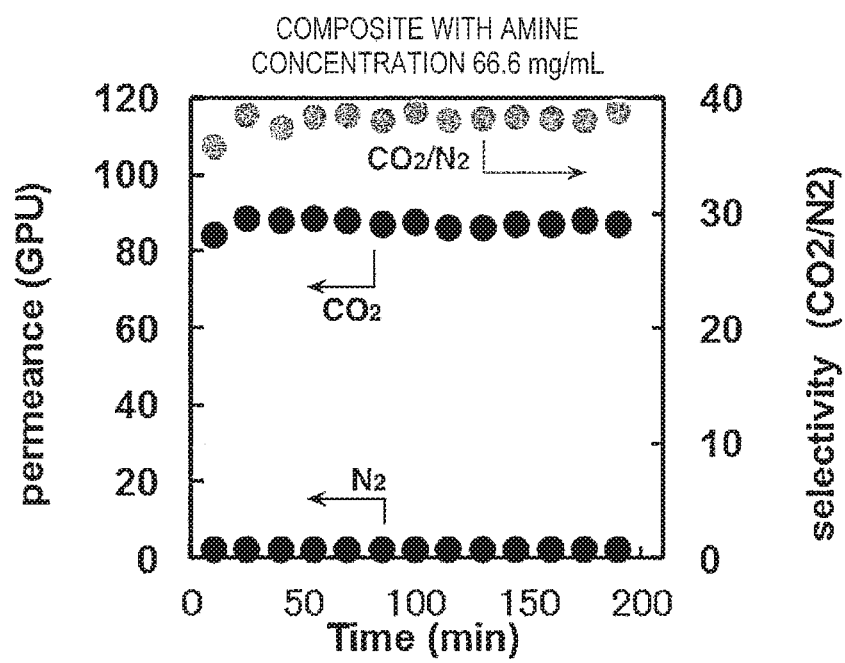
[FIG. 18]
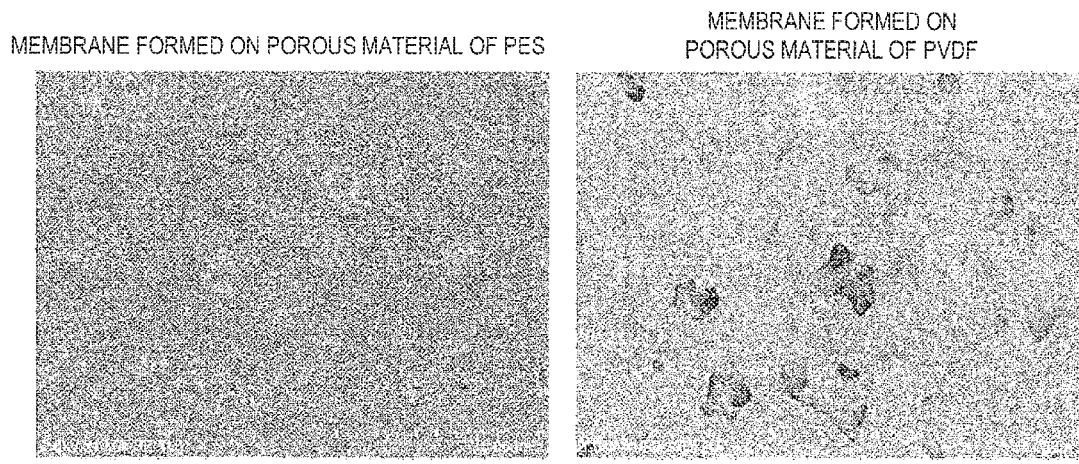

[FIG. 19]
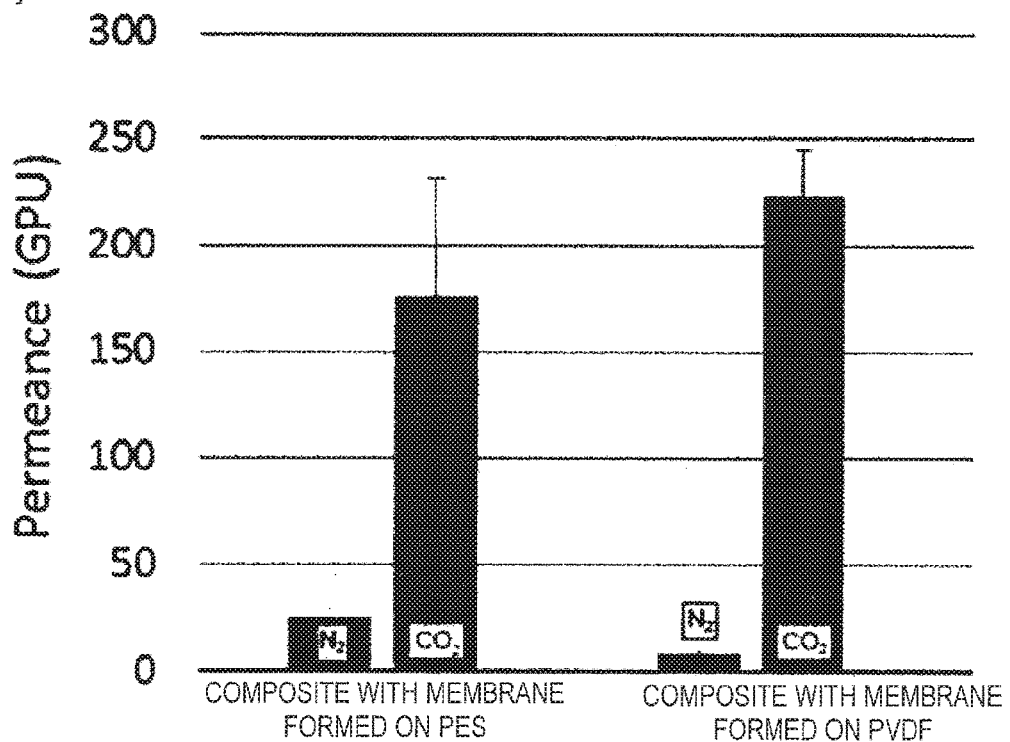
[FIG. 20]
ULTRAFILTRATION MEMBRANE
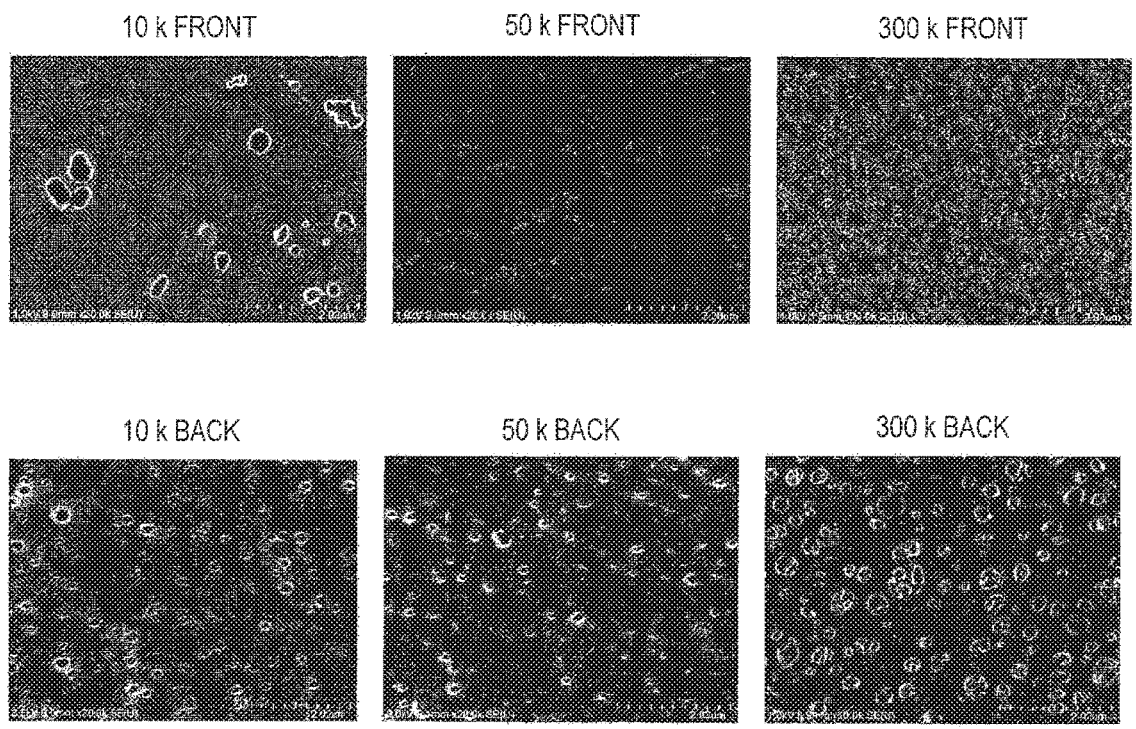

[FIG. 21]
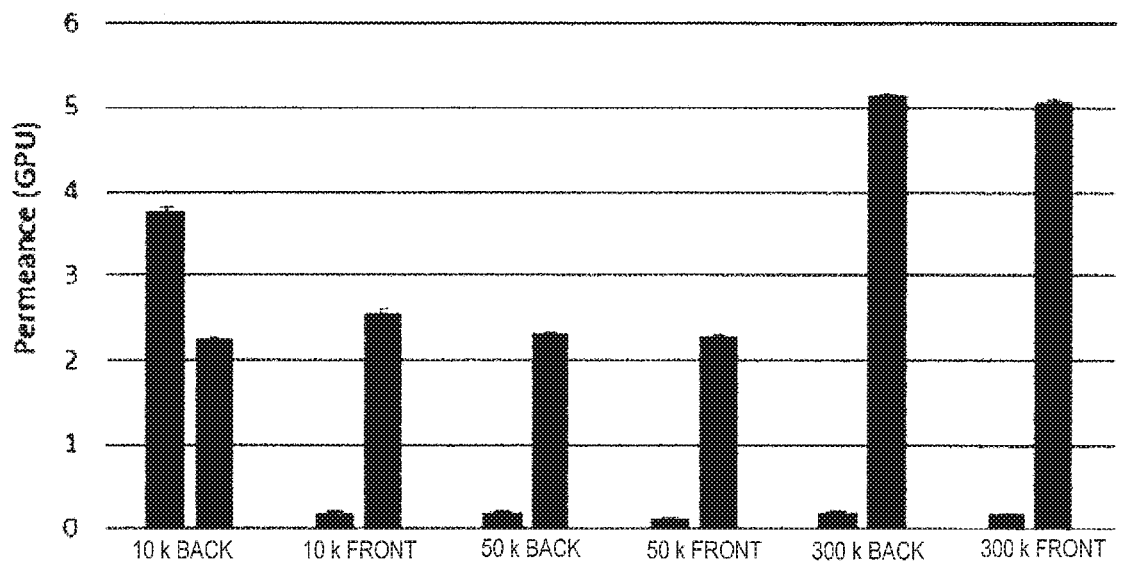
[FIG. 22]
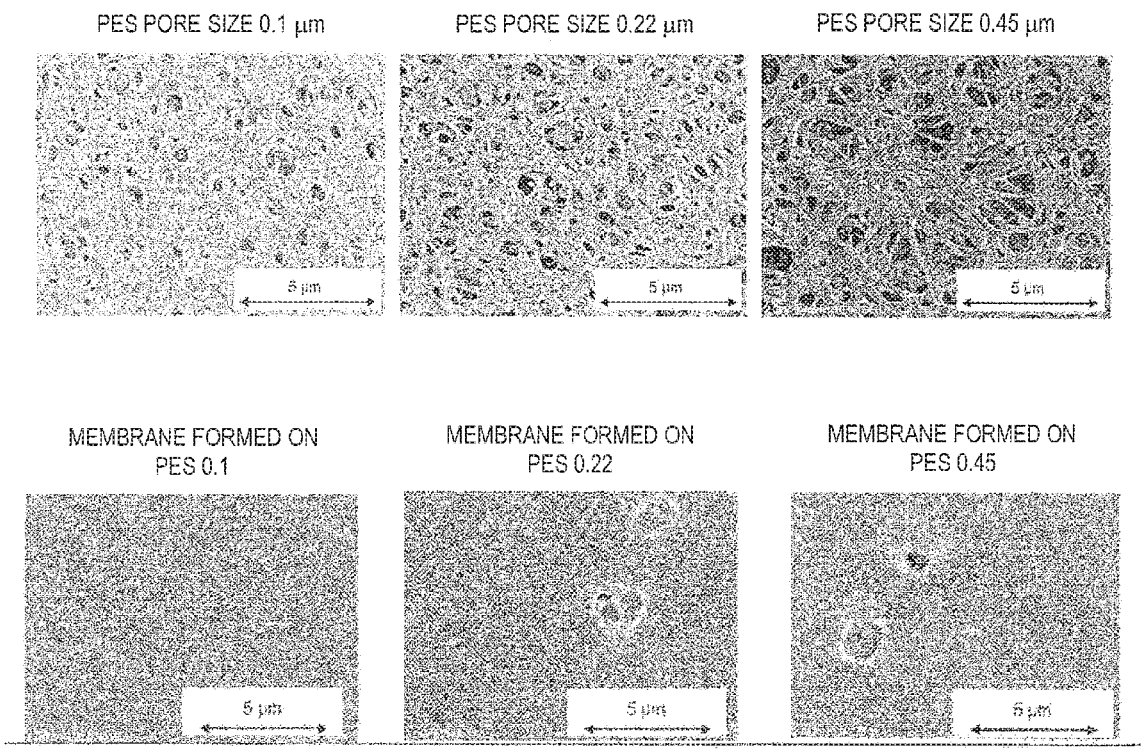

[FIG. 23]
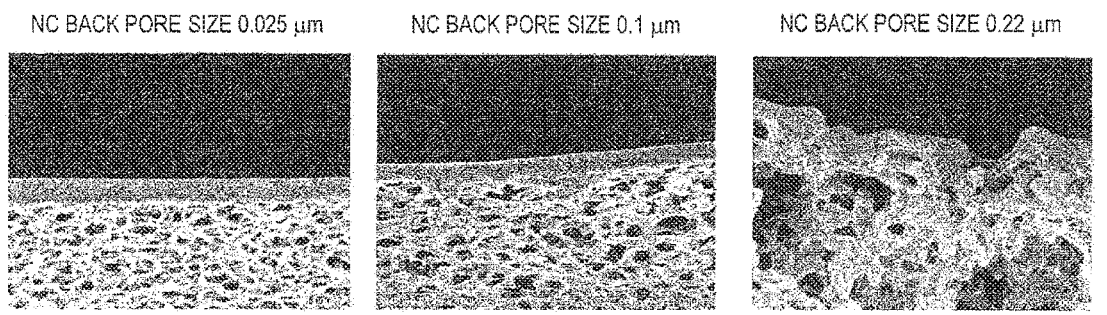
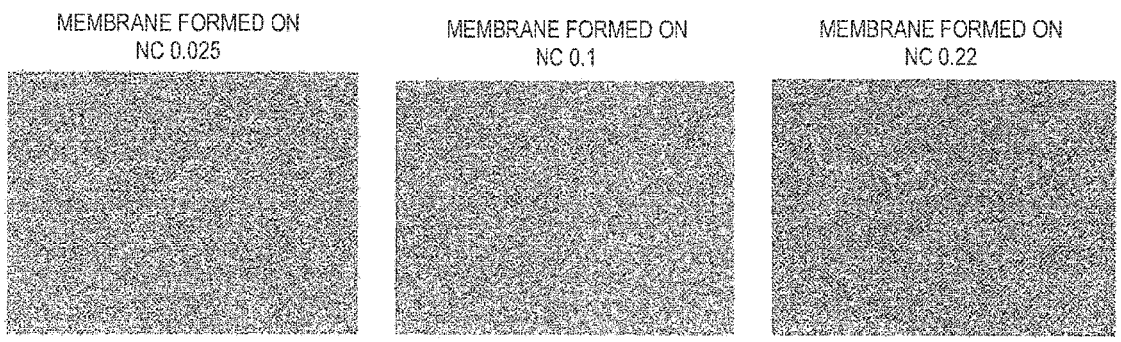
[FIG. 24]
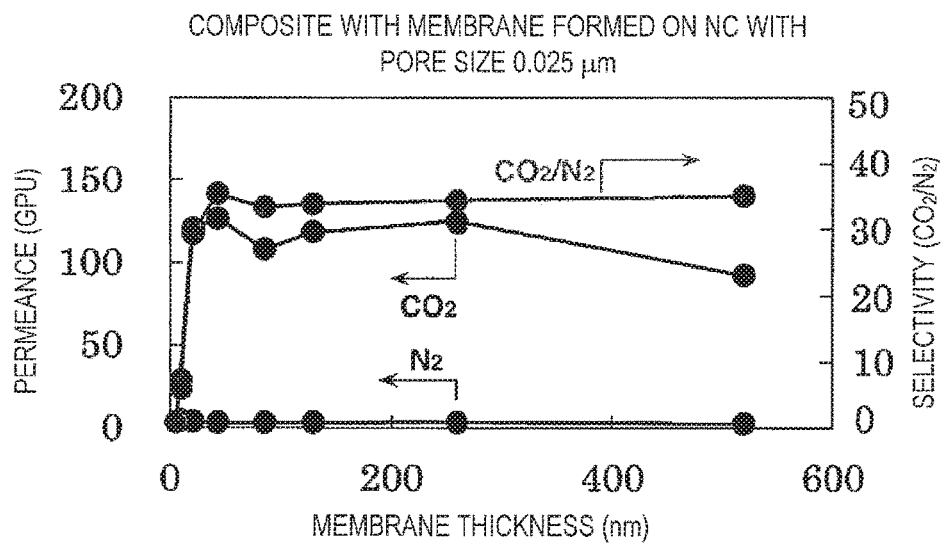

[FIG. 25]
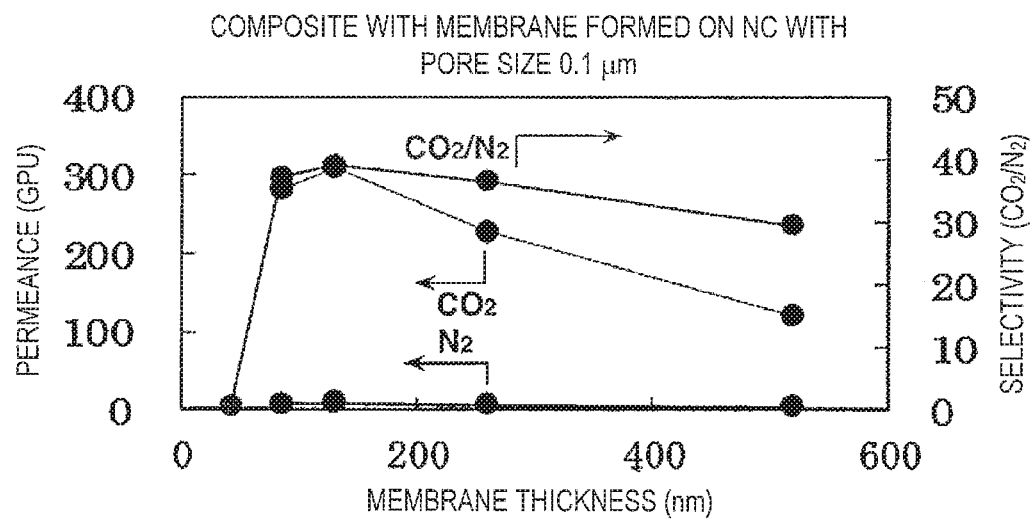
[FIG. 26]
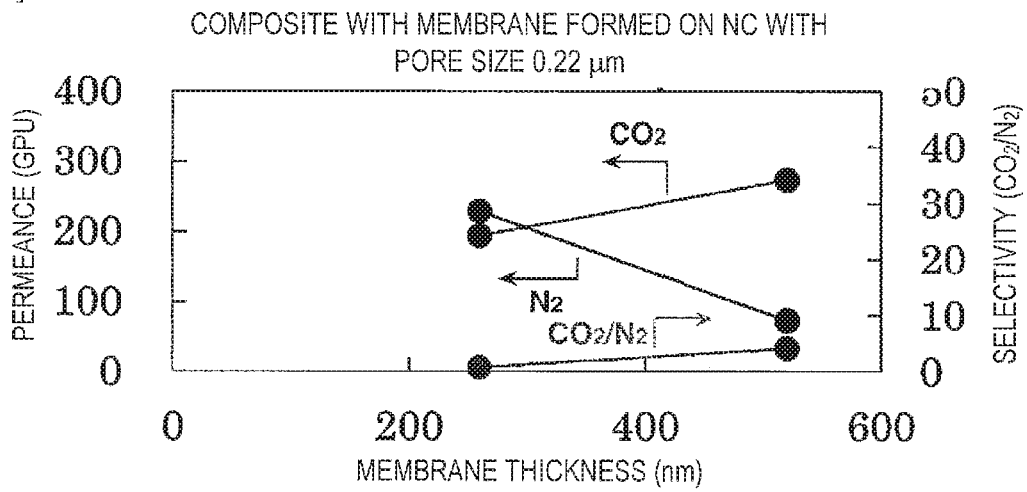

[FIG. 27]
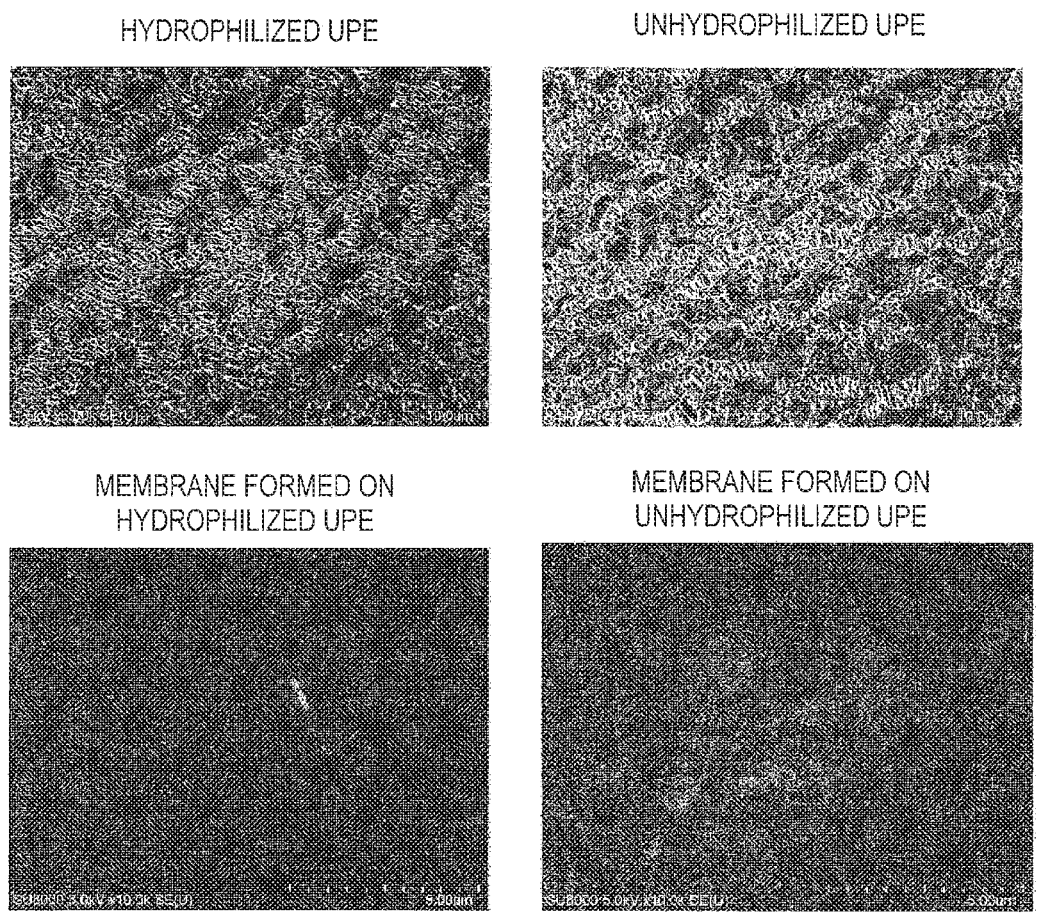
[FIG. 28]
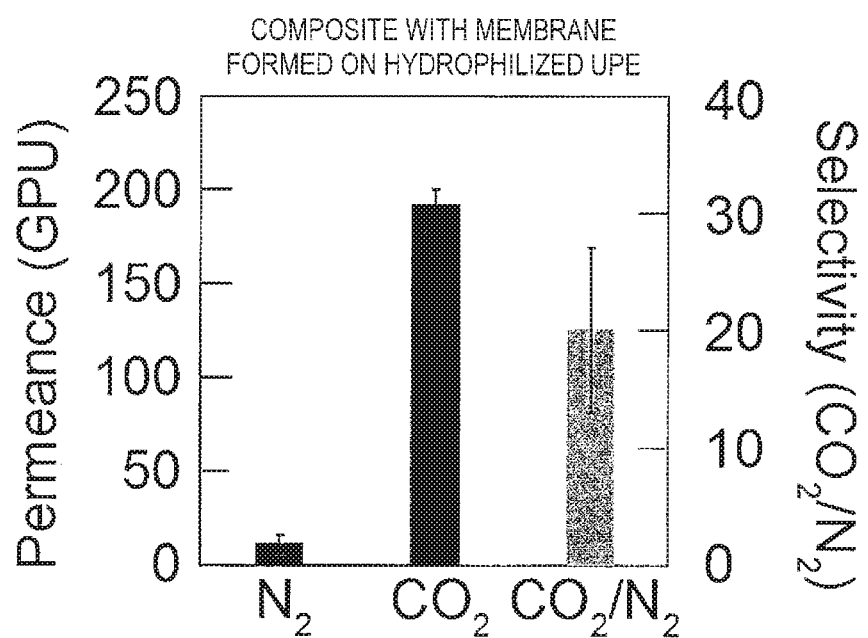

[FIG. 29]
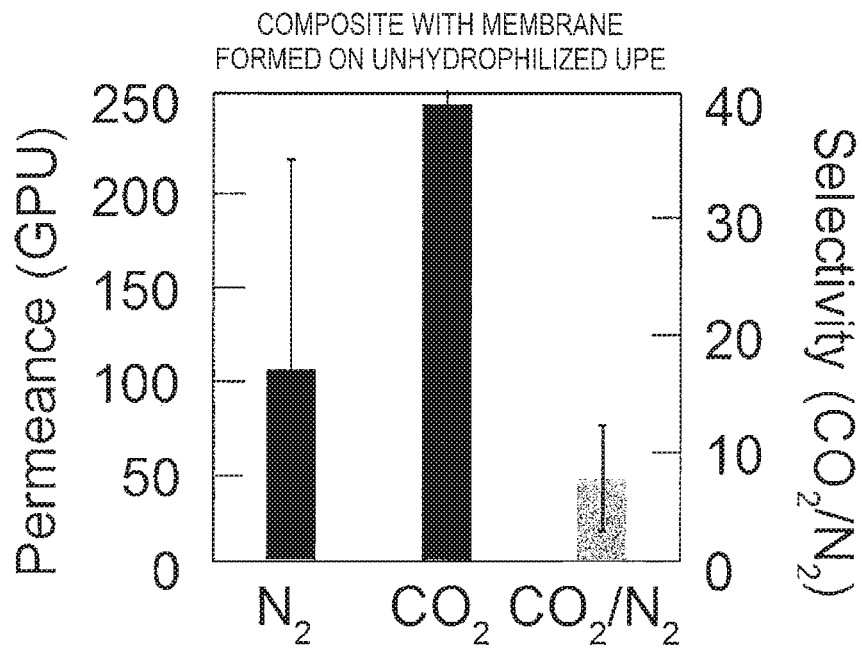
[FIG. 30]
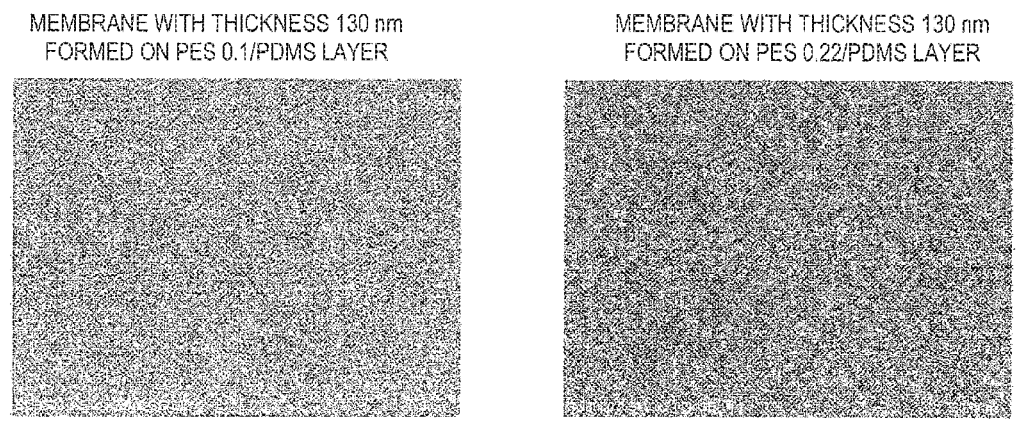
[FIG. 31]
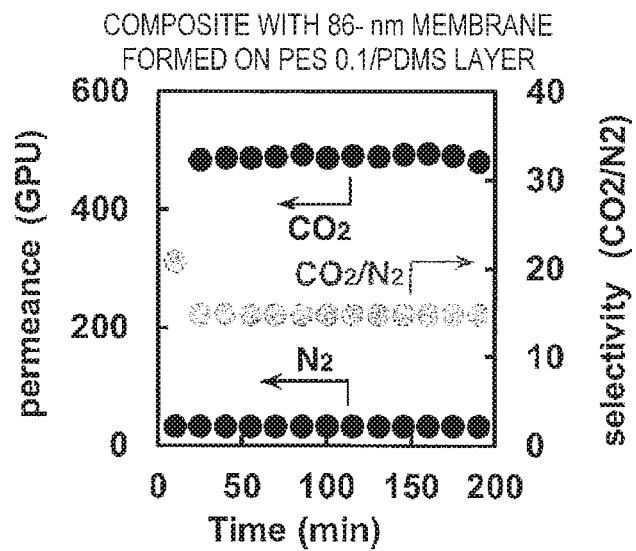

[FIG. 32]
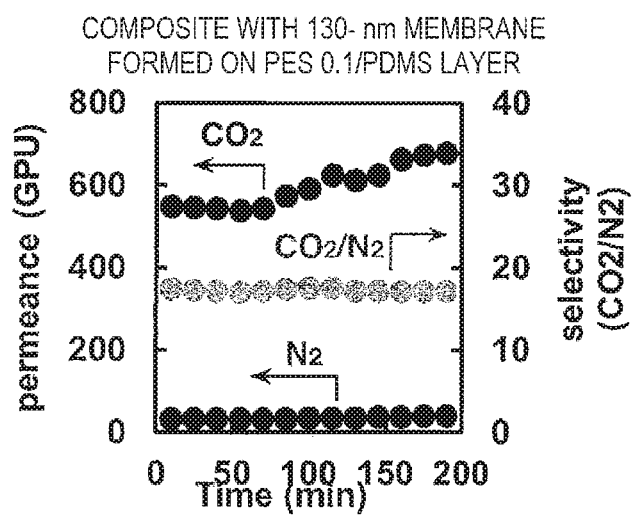
[FIG. 33]
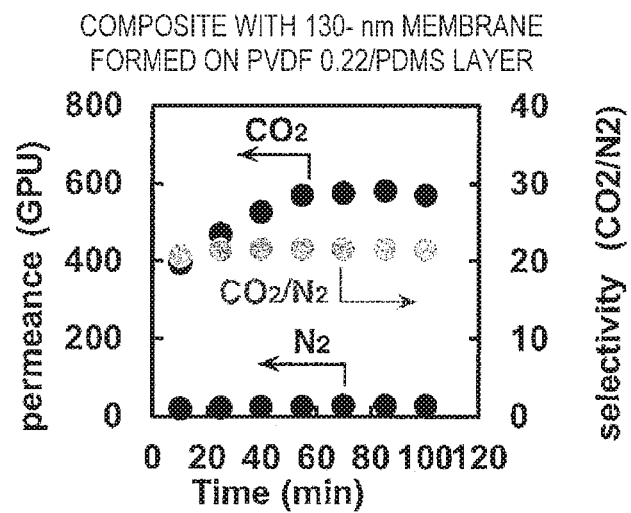

[FIG. 34]
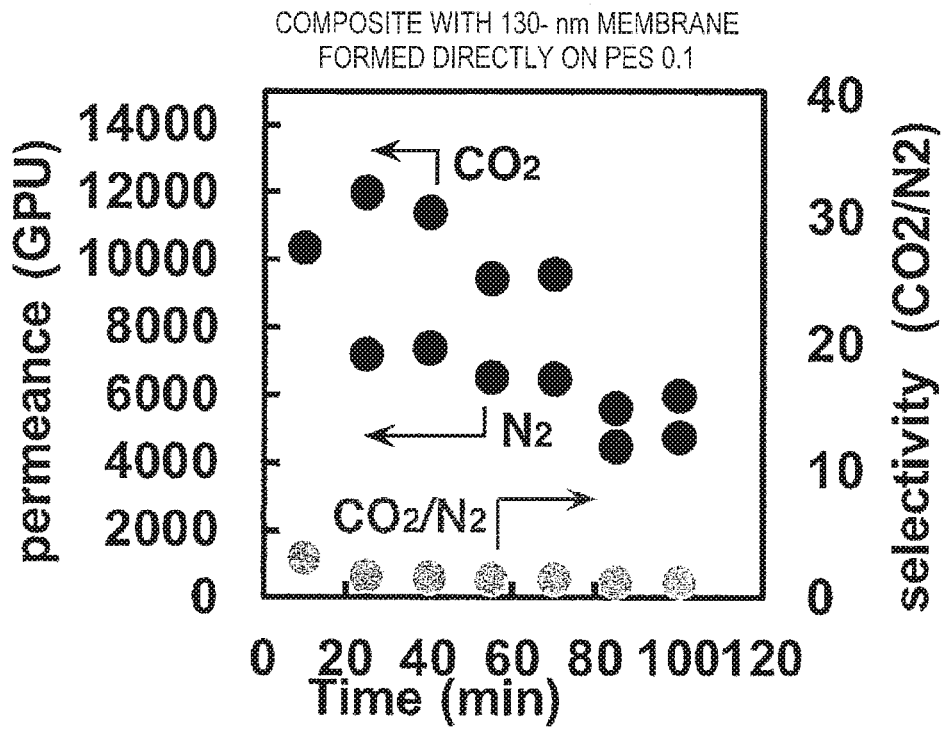
[FIG. 35]
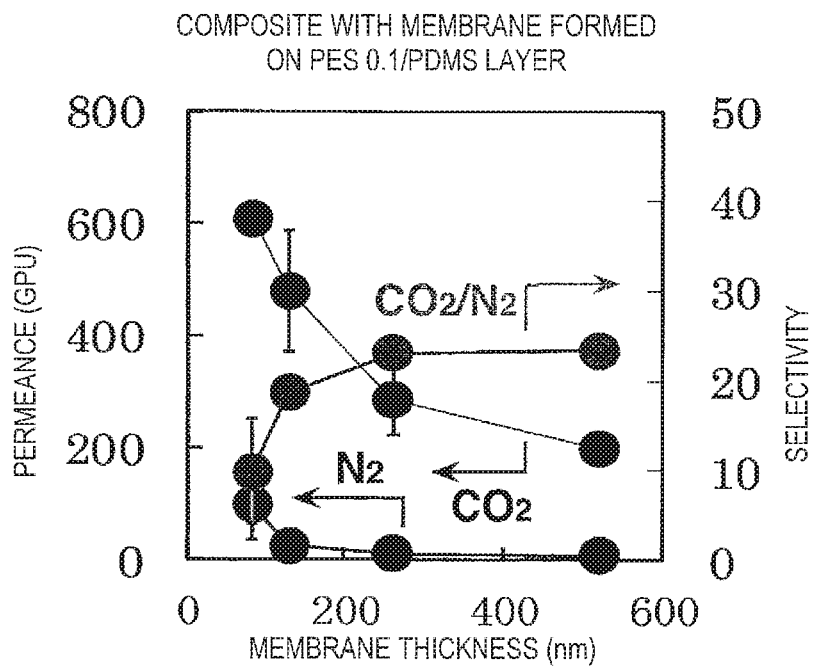

[FIG. 36]
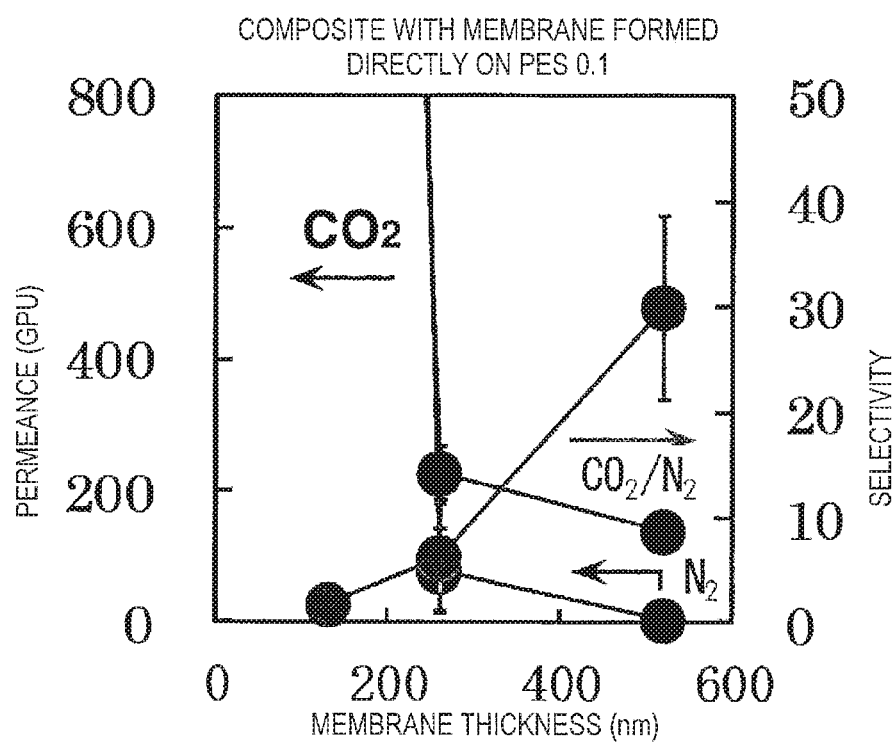

[FIG. 37]
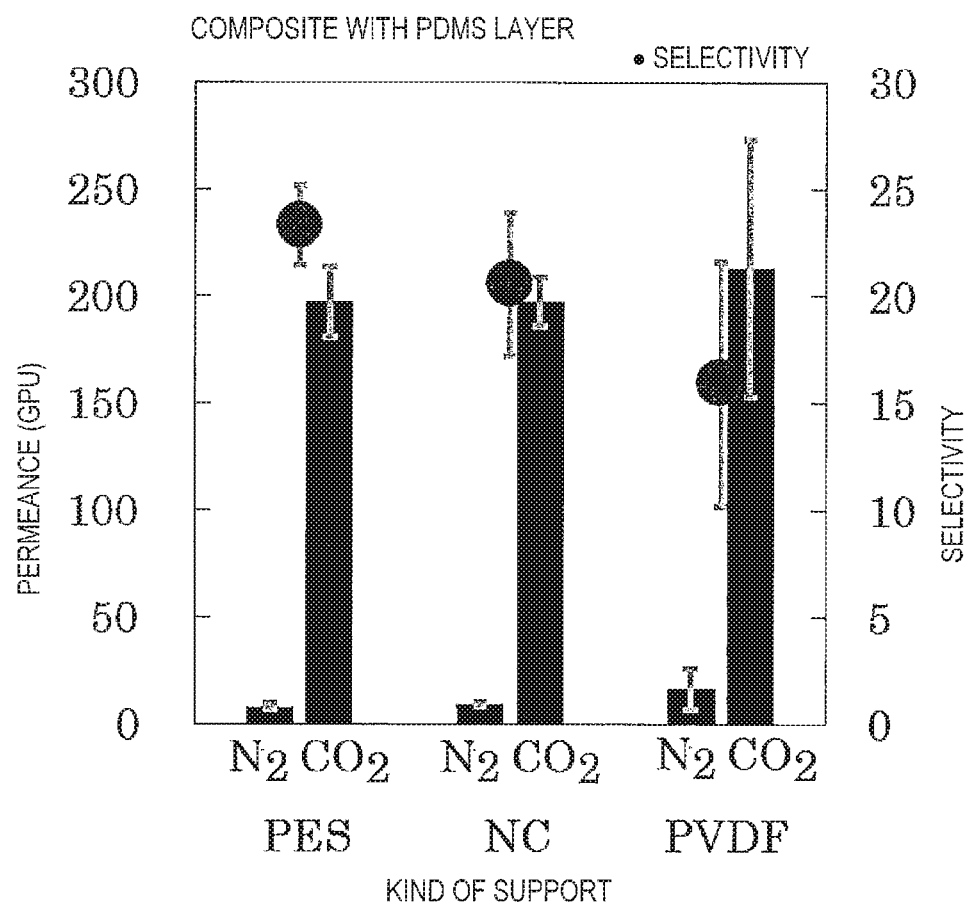

[FIG. 38]
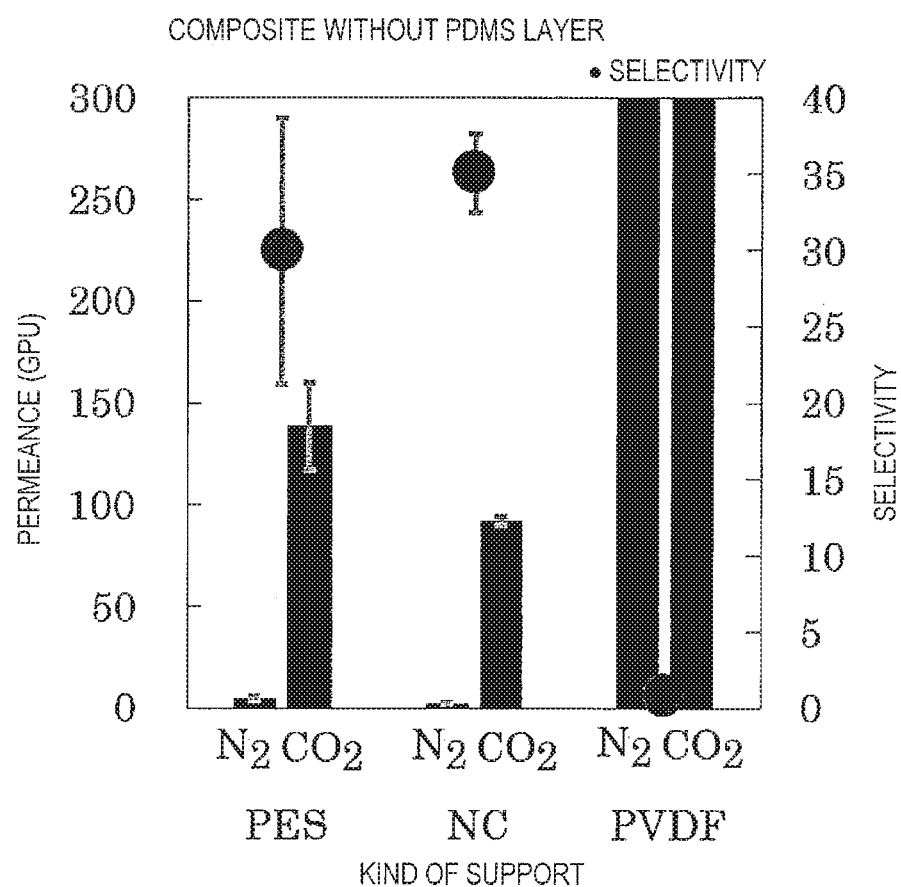
[FIG. 39]
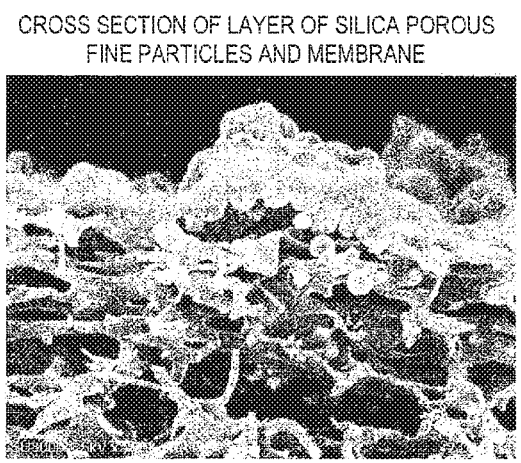
CROSS SECTION OF LAYER OF SILICA POROUS FINE PARTICLES AND MEMBRANE
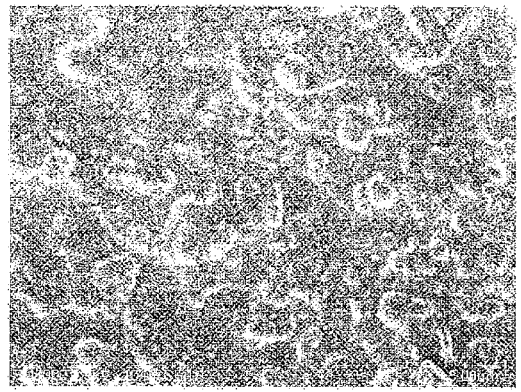
MEMBRANE FORMED ON PES 0.1/LAYER OF SILICA POROUS FINE PARTICLES

[FIG. 40]
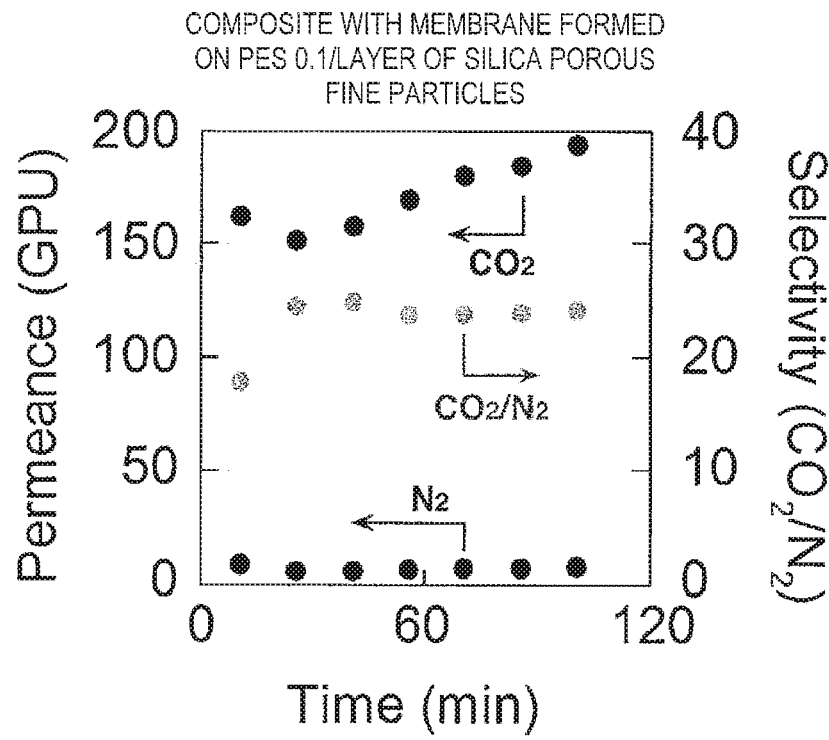
[FIG. 41]
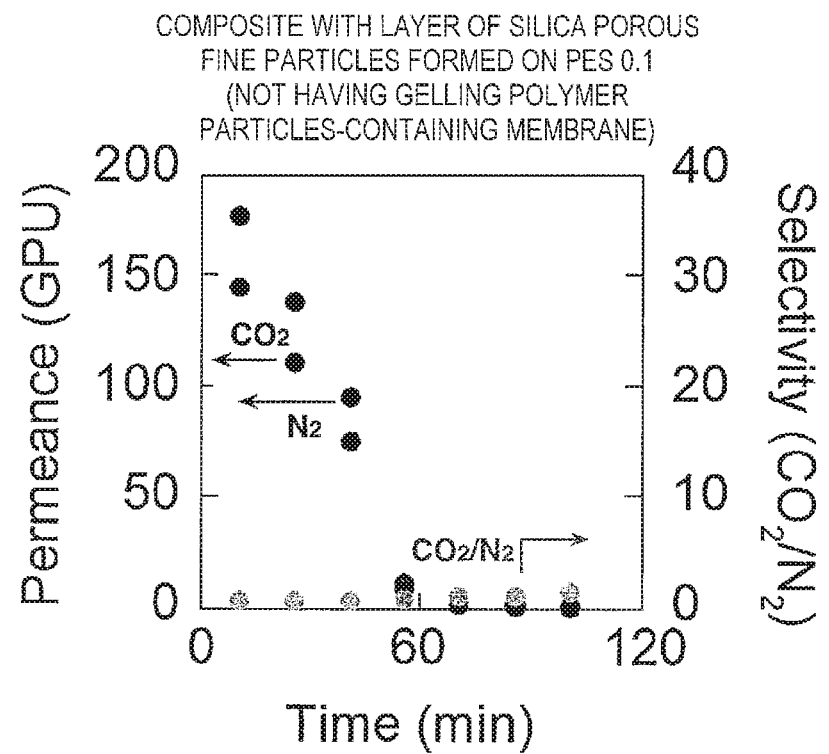

[FIG. 42]
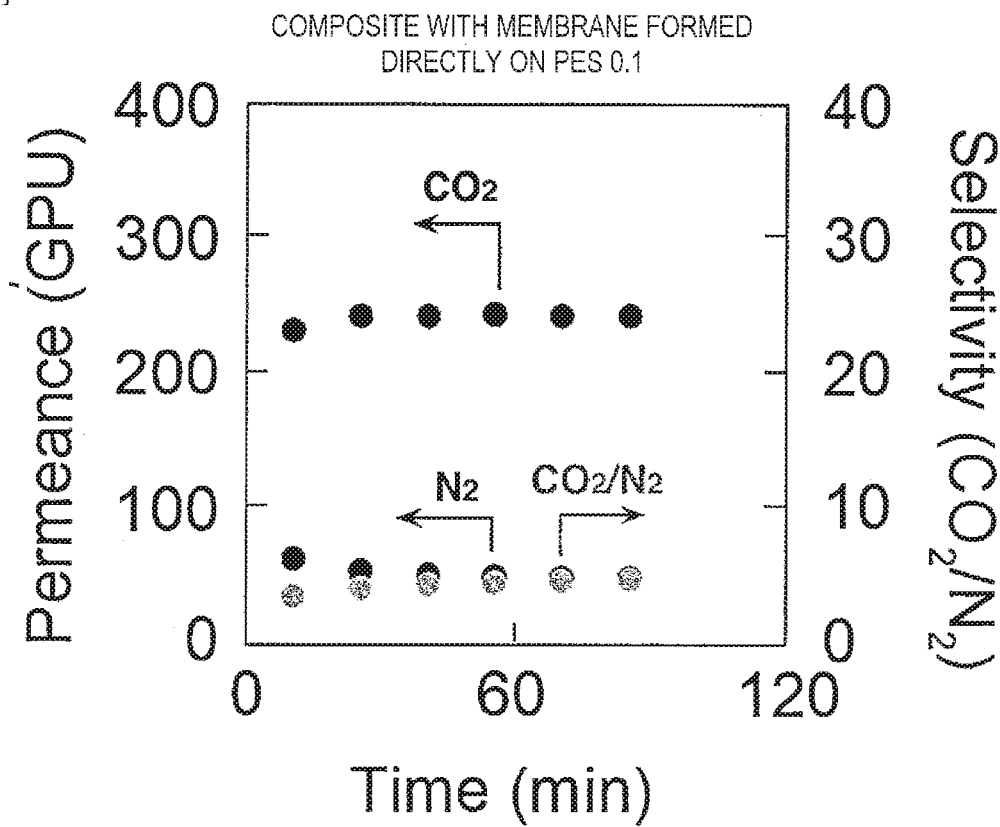
[FIG. 43]
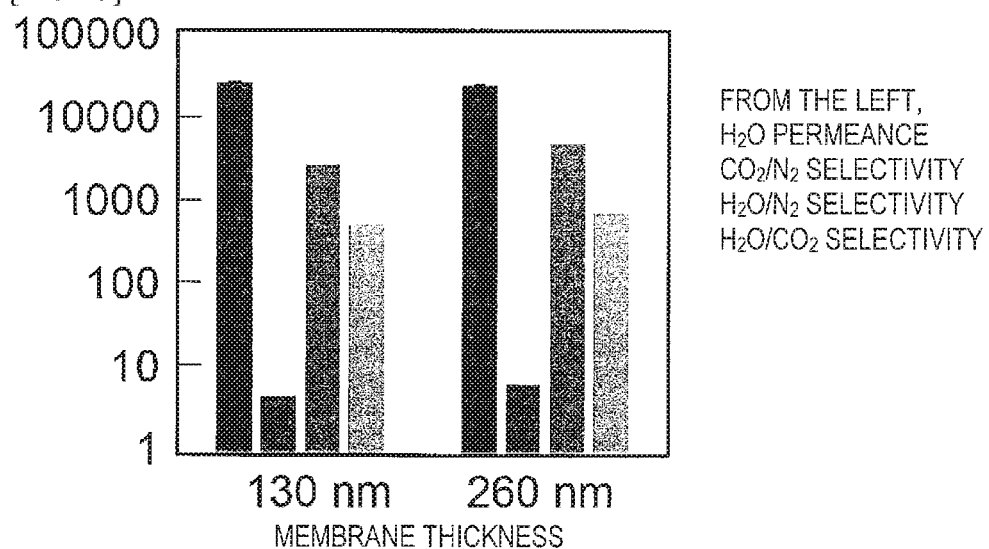
FROM THE LEFT,
H₂O PERMEANCE
CO₂/N₂ SELECTIVITY
H₂O/N₂ SELECTIVITY
H₂O/CO₂ SELECTIVITY

MONOLAYER, COMPOSITE, GAS SEPARATION MATERIAL, FILTER, GAS SEPARATION DEVICE AND METHOD FOR MANUFACTURING COMPOSITE

TECHNICAL FIELD

The present invention relates to a monolayer membrane, a composite, a gas separation material, a filter, a gas separation device and a method for producing a composite.

BACKGROUND ART

Recently, global warming by carbon dioxide and steam discharged from large-scale facilities such as thermal power plants, steel works, cement factories and others and environmental pollution by hydrogen sulfide or the like have brought about problems. For preventing such climate change and environmental pollution and for realizing a low-carbon society, studies of a method of carbon dioxide capture and storage (CCS) where an acid gas such as carbon dioxide, hydrogen sulfide or the like as well as steam discharged from such large-scale facilities is separated, recovered and placed underground or undersea are now under way. However, the energy cost for CCS by the current technology is extremely high, and significant reduction in the energy cost is desired. In particular, the process of carbon dioxide separation and recovery accounts for about 60% of the energy cost for CCS, and therefore, for reducing the energy cost for CCS, a highly-efficient and greatly energy-saving process of carbon dioxide separation and recovery is absolutely imperative. In addition, in the field of energy supply, there is employed a process of separating and recovering an acid gas such as carbon dioxide or hydrogen sulfide or steam from a natural gas having a high carbon dioxide concentration, a coal gas produced in an integrated gasification combined cycle (ATCC) or a fuel gas such as hydrogen for use in fuel cells, and efficiency enhancement and energy saving in such a process of separation and recovery of carbon dioxide or the like may be important for reducing the energy cost in the technical field.

As a method of separating carbon dioxide from exhaust gas, there is known a chemical absorption method using an aqueous amine solution or a membrane separation method.

The chemical absorption method is a method where a low-temperature absorbent liquid (aqueous amine solution) is brought into contact with an exhaust gas in an absorption tower to thereby make carbon dioxide selectively absorbed by the absorbent liquid and then the absorbent liquid is transported into a desorption tower and heated therein, thereby desorping carbon dioxide. The chemical absorption method is actually applied to treatment of exhaust gas from large-scale facilities. However, for carbon dioxide desorption, the absorbent liquid must be heated up to 130° C. or higher, which is problematic in that the necessary energy amount is large.

On the other hand, the membrane separation method is a method of separating the constituent gases in a mixed gas from each other, based on the difference in the permeation speed through a membrane between the constituent gases, and a polymer membrane or a ceramic membrane is used in the method. Through any membrane, vapor permeation is promoted by the difference in the partial pressure via the membrane so that the targeted vapor alone is made to permeate through the membrane and is thereby separated, and the advantage of the method is that any additional energy is not needed.

CITATION LIST

Patent Literature

PTL 1: JP-2016-117045
PTL 2: JP-2016-112563

SUMMARY OF INVENTION

Technical Problem

As described above, a membrane separation method is a most excellent gas separation method in the point that the necessary energy is small. However, a polymer membrane and a ceramic membrane heretofore used in the art are insufficient as a gas separation material for separating carbon dioxide from an exhaust gas discharged from large-scale facilities since the carbon dioxide permeation performance of the polymer membrane and the ceramic membrane is low or the production cost thereof is high. Consequently, it is greatly desired to develop a gas separation material usable in a membrane separation method, having a high carbon dioxide permeation performance, excellent in selective permeability, inexpensive and capable of efficiently separating carbon dioxide from a mixed gas.

Consequently, the present inventors have further made investigations for the purpose of providing a novel material having a high permeation performance and an excellent selective permeability to an acid gas such as carbon dioxide and capable of efficiently separating an acid gas from a mixed gas, and further for the purpose of providing a composite and a gas separation material capable of efficiently separating an acid gas from a mixed gas.

Solution to Problem

As a result of assiduous studies made for the purpose of solving the above-mentioned problems, the present inventors have found that, by using gelling polymer particles having a basic functional group and/or an acidic functional group for a material of a membrane, a membrane having a high carbon dioxide permeation performance and capable of selectively permeating carbon dioxide relative to nitrogen and others can be realized, and by gas separation using the membrane, carbon dioxide can be efficiently separated from a mixed gas.

The present invention has been proposed based on these findings, and specifically has the following constitution.

[1] A monolayer membrane containing gelling polymer particles having at least one of a basic functional group and an acidic functional group, and having a thickness of less than 5 μm.

[2] The monolayer membrane according to [1], wherein the basic functional group is one or more functional groups selected from the group consisting of an amino group and an ammonium group.

[3] The monolayer membrane according to [1], wherein the acidic functional group is one or more functional groups selected from the group consisting of a carboxyl group and a sulfate group.

[4] The monolayer membrane according to any one of [1] to [3], wherein the polymer compound constituting the gelling polymer particles is a polymer of a monomer component containing a monomer having at least one of a basic functional group and an acidic functional group.

[5] The monolayer membrane according to [4], wherein the monomer is a substituted acrylamide monomer.

[6] The monolayer membrane according to [5], wherein the monomer is an N-(aminoalkyl)acrylamide.

[7] The monolayer membrane according to any one of [4] to [6], wherein the monomer is a monomer having a tertiary amino group.

[8] The monolayer membrane according to any one of [4] to [7], wherein the proportion of the monomer having an amino group in the monomer component is 1 to 95 mol %, preferably 5 to 95 mol %.

[9] The monolayer membrane according to any one of [4] to [8], wherein the monomer component contains a monomer having an amino group and a monomer having a hydrophobic group, and the molar ratio of the amino group-having monomer to the hydrophobic group-having monomer is 1/95 to 95/5.

[10] The monolayer membrane according to [9], wherein the amino group-having monomer is an N-(aminoalkyl)methacrylamide and the hydrophobic group-having monomer is an N-alkylacrylamide.

[11] The monolayer membrane according to [1] or [2], wherein the gelling polymer particles are particles of a polymer compound infiltrated with a basic molecule.

[12] The monolayer membrane according to any one of [1] to [11], containing two or more kinds of gelling polymer particles.

[13] The monolayer membrane according to [12], containing gelling polymer particles having an acidic functional group and gelling polymer particles having a basic functional group.

[14] The monolayer membrane according to any one of [1] to [13], wherein the gelling polymer particles are particles which, after dispersed in water at 30° C. and well swollen therein, are to have a water content inside the particles of 40 to 99.9%.

[15] The monolayer membrane according to any one of [1] to [14], wherein the gelling polymer particles are particles which, after dispersed in water at 30° C. and well swollen therein, are to have a hydrodynamic diameter of 20 to 2000 nm.

[16] The monolayer membrane according to any one of [1] to [15], wherein the gelling polymer particles are particles which, after dispersed in water at 30° C. and well swollen therein, are to have a polymer density inside the particles of 0.3 to 80%.

[17] The monolayer membrane according to any one of [1] to [16], wherein the particle size of the gelling polymer particles in a dry state is 5 nm to 500 nm.

[18] The monolayer membrane according to any one of [1] to [17], wherein among the gelling polymer particles, a crosslinked structure is formed between at least a part of the gelling polymer particles.

[19] The monolayer membrane according to any one of [1] to [18], wherein the monolayer membrane is a sheet-like one.

[20] The monolayer membrane according to any one of [1] to [19], wherein the surface area of the monolayer membrane is 1 $cm^2$ or more.

[21] The monolayer membrane according to any one of [1] to [20], wherein the nitrogen permeance through the monolayer membrane at 40° C. is 100 GPU or less, preferably 10 CPU or less.

[22] The monolayer membrane according to any one of [1] to [21], wherein the carbon dioxide permeance through the monolayer membrane at 40° C. is 10 GPU or more, preferably 100 GPU or more.

[23] The monolayer membrane according to any one of [1] to [22], wherein the monolayer membrane contains a membrane stabilizer.

[24] The monolayer membrane according to [23], wherein the membrane stabilizer contains a polymer compound.

[25] The monolayer membrane according to [24], wherein the membrane stabilizer contains a polymer compound having at least any of a primary amino group, a secondary amino group, a tertiary amino group and a quaternary ammonium group.

[26] The monolayer membrane according to [25], wherein the membrane stabilizer contains a polyvinylamine or a polyvinylamine derivative.

[27] The monolayer membrane according to any one of [23] to [26], wherein the membrane stabilizer contains a polymerizable compound.

[28] The monolayer membrane according to any one of [23] to [27], wherein the membrane stabilizer contains a polymer compound formed through polymerization of a polymerizable compound in the membrane of gel particles.

[29] The monolayer membrane according to [27] or [28], wherein the polymerizable compound is an acrylamide or an acrylamide derivative.

[30] The monolayer membrane according to [29], containing, as the polymerizable compound, a substituted aminoalkylacrylamide and an acrylamide derivative having two polymerizable groups.

[31] The monolayer membrane according to any one of [23] to [30], wherein the membrane stabilizer contains a crosslinking agent.

[32] The monolayer membrane according to [31], wherein the crosslinking agent is a titanium crosslinking agent.

[33] The monolayer membrane according to any one of [23] to [32], wherein the content of the membrane stabilizer in the monolayer membrane is 1 to 89% by mass relative to the total amount of the monolayer membrane.

[34] The monolayer membrane according to any one of [1] to [33], wherein the monolayer membrane contains an absorption promoter.

[35] The monolayer membrane according to any one of [1] to [34], wherein the monolayer membrane contains a compound containing an amino group, an ammonium group or an imidazolium group and having a molecular weight of 61 to 10000.

[36] The monolayer membrane according to [35], wherein the monolayer membrane contains at least one of an amine having an amino group and a hydroxyl group, or an amine having three amino groups.

[37] The monolayer membrane according to [35], wherein the monolayer membrane contains at least any one of isopropylaminoethanol, N,N,N',N'-tetramethyl-1,6-hexanediamine, imino-bis(N,N-dimethylpropylamine) and N,N',N''-pentamethyldiethylenetriamine.

[38] The monolayer membrane according to any one of [1] to [37], wherein the monolayer membrane contains a moisture absorbent that is to have a relative humidity at 25° C. of 90% or less when formed into a saturated aqueous solution.

[39] The monolayer membrane according to [38], wherein the moisture absorbent contains at least any of a bromide ion, a chloride ion, an acetate ion, a carbonate ion, a bicarbonate ion, a lithium ion, a potassium ion, a calcium ion, a magnesium ion, a sodium ion, lithium bromide, lithium chloride, calcium chloride, potassium acetate, magnesium chloride, potassium carbonate and sodium carbonate.

[40] The monolayer membrane according to any one of [1] to [39], wherein the monolayer membrane contains an antioxidant.

[41] The monolayer membrane according to [40], wherein the antioxidant contains at least any of vitamin C (ascorbic acid), vitamin E (tocopherol), BHT (dibutylhydroxytoluene), BHA (butylhydroxyanisole), sodium erythorbate, propyl gallate, sodium sulfite, sulfur dioxide, hydroquinone and derivatives thereof.

A composite having a porous carrier and gelling polymer particles having at least any one of a basic functional group and an acidic functional group and filling up the surface pores of the porous carrier.

[43] The composite according to [42], wherein the porous carrier is tabular or tubular.

[44] The composite according to [42] or [43], wherein the porous carrier has a first face and a second face that are nearly parallel to each other.

[45] The composite according to [44], wherein the surface pores of the first face are filled up with the gelling polymer particles, and the surface pores of the second face are not filled up with the gelling polymer particles.

[46] The composite according to any one of [42] to [45], wherein the pore diameter of the surface pores gradually reduces toward the inside of the porous carrier.

[47] The composite according to any one of [42] to [46], wherein the region where the gelling polymer particles fill up the surface pores of the porous carrier is 1 cm$^2$ or more.

[48] The composite according to any one of [42] to [47], wherein the nitrogen permeance at 40° C. through the filled region is 100 GPU or less, preferably 10 GPU or less.

[49] The composite according to any of [42] to [48], wherein the carbon dioxide permeance at 40° C. through the filled region is 10 GPU or more, preferably 100 GPU or more.

[50] The composite according to any one of [42] to [49], wherein the gelling polymer particles form a monolayer membrane.

[51] The composite according to [50], wherein the monolayer membrane is the monolayer membrane of any one of [1] to [41].

[52] The composite according to any one of [42] to [51], wherein the porous carrier is formed of polyether sulfone (PES), polyvinylidene fluoride (PVDF), polytetrafluoroethylene (PTFE), polyolefin, polyethylene, polypropylene, polymethylpentene, cellulose mixture ester, nitrocellulose (NC), polyketone, polyimide, polystyrene, or polymethyl methacrylate.

[53] The composite according to any one of [42] to [52], wherein the porous carrier has an OH group in the surface thereof.

[54] The composite according to any one of [42] to [52], wherein the porous carrier has a COOH group in the surface thereof.

[55] The composite according to any one of [42] to [54], wherein the surface of the porous carrier is hydrophilized.

[56] The composite according to [55], wherein the hydrophilization is plasma treatment.

[57] The composite according to [55], wherein the hydrophilization is ozone treatment.

[58] The composite according to any one of [42] to [57], wherein the surface pores have a pore size of such that the gelling polymer particles do not run through the porous carrier.

[59] The composite according to any one of [42] to [58], wherein the maximum pore size of the porous carrier is less than 3 μm.

[60] The composite according to any one of [42] to [59], wherein the mean square roughness of the composite surface having the gelling polymer particles is 5 μm or less.

[61] A gas separation material having the composite of any one of [42] to [60].

[62] The gas separation material according to [61], which enables selective permeation of an acid gas therethrough.

[63] The gas separation material according to [61], which enables selective permeation of water or steam therethrough.

[64] The gas separation material according to [62], wherein the acid gas is carbon dioxide or hydrogen sulfide.

[65] The gas separation material according to any one of [61] to [64], wherein the carbon dioxide permeance at 40° C. is 10 GPU or more, preferably 100 GPU or more.

[66] The gas separation material according to any one of [61] to [64], wherein the nitrogen permeance at 40° C. is 100 GPU or less, preferably 10 GPU or less.

[67] The gas separation material according to any one of [61] to [66], wherein a mixed gas is continuously supplied for gas separation therethrough.

[68] The gas separation material according to any one of [61] to [67], which is for reducing the carbon dioxide concentration in a mixed gas.

[69] The gas separation material according to any one of [61] to [68], which is for gas separation at a temperature of 0 to 95° C.

[70] The gas separation material according to any one of [61] to [69], wherein the water amount in the monolayer membrane in gas separation is 1% by mass to 1000% by mass of the dry membrane weight.

[71] The gas separation material according to any one of [61] to [70], wherein the mixed gas to be subjected to gas separation is a natural gas, a bio gas, a landfill gas, a gas after combustion, a fuel gas, or a gas after steam reforming.

[72] The gas separation material according to any one of [61] to [71], wherein a plurality of the composites are connected in series.

[73] A filter having the gas separation material of any one of [61] to [72].

[74] A gas separation device having the gas separation material of any one of [61] to [72].

[75] A method for producing a composite, including swelling gelling polymer particles of a polymer compound having at least one of a basic functional group and an acidic functional group with a liquid, applying them onto one surface of a porous carrier, and drying them.

[76] The method for producing a composite according to [75], which is for producing the composite of any one of [42] to [60].

[77] The method for producing a composite according to [75] or [76], wherein the coating is carried out while a roll of the porous material is unrolled.

[78] The method for producing a composite according to any one of [75] to [77], wherein the carrier is rolled up after drying.

[79] The method for producing a composite according to any one of [75] to [78], wherein the liquid is water or a high-polar solvent.

[80] The method for producing a composite according to any one of [75] to [79], wherein the particle size of the gelling polymer particles in coating is 100 to 1000 nm.

[81] The method for producing a composite according to any one of [75] to [80], wherein the coating is carried out according to a spray coating method, a dip coating method, a filtration method, a bar coating method or a wet coating method.

[82] The method for producing a composite according to any one of [75] to [81], wherein the coating is carried out plural times.

[83] The method for producing a composite according to any one of [75] to [82], wherein the gelling polymer particles applied onto one face of the porous carrier fill up the pores in the vicinity of the surface of the porous carrier and do not run out through a different face.

Advantageous Effects of Invention

The monolayer membrane of the present invention has a high permeation performance to an acid gas such as carbon dioxide, and is excellent in selective permeability. Consequently, using the monolayer membrane for a gas separation material, an acid gas can be efficiently separated from a mixed gas.

BRIEF DESCRIPTION OF DRAWINGS

FIG. 1 This is a drawing showing a configuration example of a composite of the present invention, in which (a) is a schematic perspective view, and (b) is a schematic, exploded perspective view.

FIG. 2 This shows scanning electron microscope photographs of the porous materials used in Examples.

FIG. 3 This is a schematic view showing a framework of the gas permeation performance measuring device used in Examples.

FIG. 4 This shows scanning electron microscope photographs of a porous material of polyether sulfone having a pore size of 0.1 μm, a membrane containing gelling polymer particles 1, and a membrane containing a linear polymer.

FIG. 5 This is a graph showing a permeation performance of a composite formed with a membrane containing gelling polymer particles 1 and a composite formed with a membrane containing a linear polymer.

FIG. 6 This is a graph showing a change with time of the permeation performance of a composite formed with a membrane containing gelling polymer particles 1.

FIG. 7 This is a graph showing a change with time of the permeation performance of a composite formed with a membrane containing gelling polymer particles not having an amino group.

FIG. 8 This shows scanning electron microscope photographs of a membrane formed using a porous material of a polyether sulfone having a pore size of 0.1 μm and 16 mg/mL of a particle dispersion.

FIG. 9 This shows scanning electron microscope photographs of a membrane formed using a porous material of a polyether sulfone having a pore size of 0.1 μm and 1 mg/mL, of a particle dispersion.

FIG. 10 This is a graph showing a thickness dependence of permeation performance of a composite produced using 16 mg/mL of a particle dispersion.

FIG. 11 This is a graph showing a thickness dependence of permeation performance of a composite produced using 1 mg/mL of a particle dispersion.

FIG. 12 This is a graph showing a pKa dependence of the permeation performance of a composite formed with a membrane containing gelling polymer particles.

FIG. 13 This is a graph drawn by plotting a carbon dioxide permeance through a composite formed with a membrane containing gelling polymer particles, relative to the reciprocal of the membrane thickness.

FIG. 14 This is a graph showing a change with time of the permeation performance of a composite formed with a membrane containing gelling polymer particles 13 having a carboxyl group.

FIG. 15 This shows scanning electron microscope photographs of a porous material of a polyether sulfone having a pore size of 0.1 μm, a membrane containing gelling polymer particles 2 having a particle diameter of 89 nm, and a membrane containing gelling polymer particles 1 having a particle diameter of 235 nm.

FIG. 16 This is a graph showing an amine concentration dependence of permeation performance of a composite formed with a membrane containing gelling polymer particles 1.

FIG. 17 This is a graph showing a change with time of permeation performance of a composite having an amine concentration of 66.6 mg/mL.

FIG. 18 This shows scanning electron microscope photographs of a membrane formed on a porous material of a polyether sulfone having a pore size of 0.1 μm and a membrane formed on a porous material of a polyvinylidene fluoride having a pore size of 0.1 μm.

FIG. 19 This is a graph showing permeation performance of a composite of a 260 nm-thick membrane formed on a porous material of a polyether sulfone having a pore size of 0.1 μm and a composite of a 260 nm-thick membrane formed on a porous material of a polyvinylidene fluoride having a pore size of 0.1 μm.

FIG. 20 This shows scanning electron microscope photographs of various ultrafiltration membranes.

FIG. 21 This is a graph showing permeation performance of a composite of a membrane containing gelling polymer particles 1, formed on an ultrafiltration membrane.

FIG. 22 This shows scanning electron microscope photographs of a porous material of a polyether sulfone having a pore size of 0.1 μm, 0.22 μm or 0.45 μm, and a film formed on the porous material.

FIG. 23 This shows scanning electron microscope photographs of a cross section and a film surface of a porous material of a cellulose mixture ester (hereinafter referred to as nitrocellulose) having a pore size of 0.025 μm, 0.1 μm or 0.22 μm formed with a membrane.

FIG. 24 This is a graph showing a thickness dependence of permeation performance of a composite of a membrane formed on a porous material of a nitrocellulose having a pore size of 0.025 μm.

FIG. 25 This is a graph showing a thickness dependence of permeation performance of a composite of a membrane formed on a porous material of a nitrocellulose having a pore size of 0.1 μm.

FIG. 26 This is a graph showing a thickness dependence of permeation performance of a composite of a membrane formed on a porous material of a nitrocellulose having a pore size of 0.22 μm.

FIG. 27 This shows scanning electron microscope photographs of a porous material of a hydrophilized ultra-high-molecular-weight polyethylene, a porous material of an unhydrophilized ultra-high-molecular-weight polyethylene, and membranes formed on these porous materials.

FIG. 28 This is a graph showing permeation performance of a composite of a membrane formed on a porous material of a hydrophilized ultra-high-molecular-weight polyethylene.

FIG. 29 This is a graph showing permeation performance of a composite of a membrane formed on a porous material of an unhydrophilized ultra-high-molecular-weight polyethylene.

FIG. 30 This shows scanning electron microscope photographs of a membrane formed on a porous material of a polyether sulfone having a pore size of 0.1 μm via a PDMS layer, and a membrane formed on a porous material of a polyvinylidene fluoride having a pore size of 0.1 μm via a PDMS layer.

FIG. 31 This is a graph showing a change with time of permeation performance of a composite of a membrane having a thickness of 86 μm, formed on a porous material of a polyether sulfone having a pore size of 0.1 μm via a PDMS layer.

FIG. 32 This is a graph showing a change with time of permeation performance of a composite of a membrane having a thickness of 130 nm, formed on a porous material of a polyether sulfone having a pore size of 0.1 μm via a PDMS layer.

FIG. 33 This is a graph showing a change with time of permeation performance of a composite of a membrane having a thickness of 130 nm, formed on a porous material of a polyvinylidene fluoride having a pore size of 0.1 μm via a PDMS layer.

FIG. 34 This is a graph showing a change with time of permeation performance of a composite of a membrane having a thickness of 130 nm, directly formed on a porous material of a polyether sulfone having a pore size of 0.1 μm.

FIG. 35 This is a graph showing a thickness dependence of permeation performance of a composite of a membrane formed on a porous material of a polyether sulfone having a pore size of 0.1 μm via a PDMS layer.

FIG. 36 This is a graph showing a thickness dependence of permeation performance of a composite of a membrane directly formed on a porous material of a polyether sulfone having a pore size of 0.1 μm.

FIG. 37 This is a graph showing permeation performance of a composite of a membrane formed on a porous material of a polyether sulfone having a pore size of 0.1 μm via a PDMS layer, a composite of a membrane formed on a porous material of a nitrocellulose having a pore size of 0.025 μm via a PDMS layer, and a composite of a membrane formed on a porous material of a polyvinylidene fluoride having a pore size of 0.22 μm via a PDMS layer.

FIG. 38 This is a graph showing permeation performance of a composite of a membrane formed on a porous material of a polyether sulfone having a pore size of 0.1 μm, a composite of a membrane formed on a porous material of a nitrocellulose having a pore size of 0.025 μm, and a composite of a membrane formed on a porous material of a polyvinylidene fluoride having a pore size of 0.22 μm.

FIG. 39 This shows scanning electron microscope photographs of a cross section of a layer of silica porous fine particles and a membrane, and a membrane surface thereof.

FIG. 40 This is a graph showing a change with time of permeation performance of a composite of a membrane formed on a porous material of a polyether sulfone having a pore size of 0.1 μm, via a layer of silica porous fine particles.

FIG. 41 This is a graph showing a change with time of permeation performance of a composite of a layer of silica porous fine particles formed on a porous material of a polyether sulfone having a pore size of 0.1 μm (composite not having a membrane containing gelling polymer particles).

FIG. 42 This is a graph showing a change with time of permeation performance of a composite of a membrane directly formed on a porous material of a polyether sulfone having a pore size of 0.1 μm.

FIG. 43 This is a graph showing a water permeance and a selectivity for various gases through a composite of a membrane formed on a porous material of a nitrocellulose having a pore size of 0.1 μm.

DESCRIPTION OF EMBODIMENTS

Hereinunder the present invention is described in detail. The description of the constitutive elements of the invention given hereinunder is for some typical embodiments and specific examples of the invention, but the invention should not be limited to such embodiments.

The "gelling polymer particles" in the present invention are polymer particles having such a property that the particles are swollen in water or in a polar solvent to be gel-like fine particles. The gelling polymer particles may be particles formed of a polymer compound alone or particles of a polymer compound with a low-molecular compound infiltrated thereinto or adhering thereto. Preferred gelling polymer particles are particles which, after dispersed in water at 30° C. to be well swollen, may have a water content inside the particles of 40 to 99.9%. Other preferred gelling polymer particles are particles which, after dispersed in water at 30° C. to be well swollen, may have a hydrodynamic diameter of 20 to 2000 nm. Preferably, the gelling polymer particles in the present invention have such a reversibility that, after the particles are swollen and gelled in water or in a polar solvent, then water or the polar solvent is removed and the particles are dried, and thereafter when water or a polar solvent is added thereto, then the particles are restored to the original gel state.

In this description, the numerical range expressed by "X to Y" indicates a range that includes the numerical value X or the numerical Y as the minimum value or the maximum value. Also in tins description, "(meth)acrylamide" means "acrylamide" and "methacrylamide".

<Monolayer Membrane>

The monolayer membrane of the present invention contains gelling polymer particles having at least one of a basic functional group and an acidic functional group, and has a thickness of less than 5 μm.

The monolayer membrane of the present invention has such a configuration and therefore can make a specific gas or liquid selectively permeate therethrough at a large permeance. Consequently, for example, in the case where the membrane is used as a separation material in such a manner that a mixture is supplied thereto and a specific gas or liquid therein is separated by permeation through the membrane, the gas or liquid can be efficiently separated at a high selectivity.

The "monolayer membrane" in the present invention is meant to indicate a single-layer membrane that contains gelling polymer particles having at least one of a basic functional group and an acidic functional group. For example, a membrane formed by repeating a step of coating with a suspension of gelling polymer particles, then drying it, and thereafter further coating with a suspension containing gelling polymer particles and drying it, as described in the column of Examples to be given hereinunder, is included in the "monolayer membrane" in this description. The monolayer membrane may contain one kind alone or two or more kinds of gelling polymer particles. In the case where the monolayer membrane contains two or more kinds of gelling polymer particles, preferably, one kind thereof is gelling polymer particles having a basic functional group and the other kind thereof is gelling polymer particles having an acidic functional group.

The "thickness" of the monolayer membrane of the present invention is a thickness thereof measured with a scanning electron microscope. The thickness of the monolayer membrane is preferably less than 4 μm, more preferably less than 2 μm, even more preferably less than 1 μm, and still more preferably less than 500 nm. With that, the permeance of the gas or liquid to selectively permeate the monolayer membrane can be increased. The lower limit of the monolayer membrane is preferably more than 10 nm from the viewpoint of continuously forming the monolayer membrane with no breakage.

In the following, the components constituting the monolayer membrane and the properties of the monolayer membrane are described.

[Gelling Polymer Particles Having at Least One of Basic Functional Group and Acidic Functional Group]

The gelling polymer particles for use in the present invention have at least one of a basic functional group and an acidic functional group.

Typical gelling polymer particles are gelling polymer compound particles having an amino group, an ammonium group or an imidazolium group, and those having an amino group are preferred.

(Gelling Polymer Particles Having Amino Group)

The polymer compound particles having an amino group are particles of a polymer compound having an amino group, and are preferably composed of an amino group-having polymer compound alone, but may contain materials used in preparing the particles, for example, a grain size controlling component such as a surfactant, as well as a polymer of a (meth)acrylamide derivative, a crosslinking agent, an unreacted monomer, etc.

Not specifically limited, the amino group-having polymer compound includes (meth)acrylamide polymers and derivatives thereof, polyethyleneimines and derivatives thereof, polyvinylamines and derivatives thereof, polyvinyl alcohols and derivatives thereof, polyallylamines and derivatives thereof. Specific examples of the constitutive monomer include N,N-dimethylaminopropylmethacrylamide, N,N-diethylaminopropylmethacrylamide, N,N-dimethylaminoethylmethacrylamide, N,N-diethylaminoethylmethacrylamide, N,N-dimethylaminopropyl methacrylate, N,N-diethylaminopropyl methacrylate, N,N-dimethylaminoethyl methacrylate, N,N-diethylaminoethyl methacrylate, N,N-dimethylaminopropylacrylamide, N,N-diethylaminopropylacrylamide, N,N-dimethylaminoethylacrylamide, N,N-diethylaminoethylacrylamide, 3-aminopropylmethacrylamide hydrochloride, 3-aminopropylacrylamide hydrochloride, N,N-dimethylaminopropyl acrylate, N,N-diethylaminopropyl acrylate, N,N-dimethylaminoethyl acrylate, N,N-diethylaminoethyl acrylate, 3-aminopropyl methacrylate hydrochloride, and 3-aminopropyl acrylate hydrochloride, and acrylamide polymers are preferred.

The amino group of the amino group-having polymer compound may be any of a primary amino group, a secondary amino group or a tertiary amino group, but preferably, the conjugate acid dissociation constant thereof is planned. In particular, for dissolving carbon dioxide, the acid dissociation constant of the amino group is preferably the same as or larger than the acid dissociation constant of carbonic acid. Above all, a secondary or tertiary amino group is preferred, and a tertiary amino group is more preferred. A dialkylamino group such as a dimethylamino group is more preferred. The amino group of the polymer compound may bond to the main chain or may bond to the side chain, but preferably bonds to the side chain.

Preferably, the amino group-having polymer compound has a hydrophobic group. The hydrophobic group to be introduced into the polymer compound includes a hydrocarbon group represented by $C_xH_{2x}$ or $C_xH_{2x+1}$, and is preferably a methyl group, an ethyl group, a propyl group, an isopropyl group, a butyl group, an isobutyl group, a tert-butyl group, a pentyl group, a cyclopentyl group, an isopentyl group, a hexyl group, or a cyclohexyl group. Above all, an isobutyl group or a tert-butyl group is more preferred. A hydroxyl group may bond to the hydrophobic group to form a hydroxyethyl group, a hydroxypropyl group or a hydroxybutyl group, which may be in the polymer compound.

The amino group-having polymer compound is preferably such that the polymer compound particles have, after dispersed in water and swollen therein, a polymer density inside the particles of 0.3 to 80%, more preferably 1 to 60%.

(Preparation of Amino Group-Having Polymer Compound Particles)

The amino group-having polymer compound particles may be prepared using solutions containing monomer components (hereinafter these are referred to as "particles preparing liquids"). In this description, the "monomer components" indicate all monomers to be subjected to synthesis of the polymer of the amino group-having polymer compound particles. A method for producing the polymer compound particles is not specifically limited, and any conventionally-known methods are employable, including a precipitation polymerization method, a pseudo-precipitation polymerization method, an emulsion polymerization method, a dispersion polymerization method, a suspension polymerization method, and a seed polymerization method.

The monomer component for use for preparing the particles contains at least a monomer having an amino group, and preferably contains a monomer having an amino group and a monomer not having an amino group. Specifically, the amino group-having polymer compound may be a homopolymer or a copolymer of an amino group-having monomer, or may be a copolymer of an amino group-having monomer and a monomer not having an amino group. With that, the monomer proportion can be controlled and the amino group density in the polymer compound particles can be thereby controlled to fall within a suitable range. The amino group-having monomer and the monomer not having an amino group and used optionally are preferably a substituted (meth)acrylamide monomer, more preferably a substituted acrylamide monomer.

Regarding the description and the preferred range of the amino group of the amino group-having monomer, the description and the preferred range of the amino group of the amino group-having polymer compound may be referred to. The number of the amino groups that the monomer has is not specifically limited, and may be one, or may be 2 or more. In the case where the monomer has 2 or more amino groups, the amino groups may be the same or different.

Not specifically limited, the amino group-having monomer includes N-(aminoalkyl)acrylamide, and N-(aminoalkyl)methacrylamide. N-(aminoalkyl)acrylamide is preferred.

The monomer component preferably contains a monomer having a hydrophobic group along with the amino group-having monomer. Regarding the description and the preferred range of the hydrophobic group of the hydrophobic group-having monomer, the description and the preferred range of the hydrophobic group that may be in the amino group-having polymer compound may be referred to. Preferably, the hydrophobic group is in the side chain. The hydrophobic group-having monomer may further have or may not have an amino group.

Not specifically limited, the hydrophobic group-having monomer includes N-alkylacrylamide, N-alkylmethacrylamide, N-alkyl acrylate, N-alkyl methacrylate, N,N-dialkylacrylamide, N-(hydroxyalkyl)methacrylamide, N,N-dialkyl acrylate, N-(hydroxyalkyl) methacrylate, N,N-dialkylmethacrylamide, N-(hydroxyalkyl)acrylamide, methacrylate, and N-(hydroxyalkyl) acrylate. N-alkylacrylamide is preferred.

A preferred combination of an amino group-having monomer and a hydrophobic group-having monomer is a combination of N-alkyl)(meth)acrylamide and N-alkyl(meth)acrylamide, and a combination of N-(aminoalkyl) methacrylamide and N-alkylacrylamide is preferred. In the particles of a copolymer of N-(aminoalkyl)(meth)acrylamide and N-alkyl(meth)acrylamide, the hydrophobic alkyl group and the hydrogen-bonding amide are uniformly distributed in the molecule in a well-balanced manner.

The proportion of the amino group-having monomer in the monomer component is preferably 1 to 95 mol % relative to the total molar number of the monomer component, more preferably 5 to 95 mol %, even more preferably 30 to 60 mol %. In the case where the monomer component contains a hydrophobic group-having monomer, the molar ratio of the amino group-having monomer to the hydrophobic group-having monomer is preferably 95/5 to 5/95, more preferably 2/1 to 1/2. A monomer having both an amino group and a hydrophobic group is grouped in the category of a monomer having an amino group.

The particles preparing liquid may contain a monomer component alone, hut may contain any other component. The other component includes a surfactant, a crosslinking agent, a polymerization initiator, and a pKa regulator. By changing or controlling the kind and the concentration of the surfactant to be added to the particles preparing liquid, the particle size of the resultant polymer compound particles can be controlled. Using a crosslinking agent, a crosslinking structure may be formed in the polymer compound in the particles and the swellability of the particles may be thereby controlled so that the particles are not swollen excessively. In the case where a crosslinking agent is used relatively in a large amount, or in the case where the monomer concentration in polymerization is set to be relatively high, a crosslinking structure may be formed between the particles. With that, a relatively large continuous void structure may be formed between the composite particles linked via the crosslinking structure. A pKa regulator is for regulating the pKa value of the resultant polymer compound particles to a desired value, and with that, the kind and the permeance of the gas or the liquid to selectively permeate the monolayer membrane and the selectivity thereof relative to the other mixed components can be controlled.

As the surfactant, a cationic surfactant such as cetyltrimethylammonium bromide may be used.

The crosslinking agent may be any one capable of forming a crosslinking structure between the monomers used, and N,N'-alkylenebisacrylamide is preferably used. The carbon number of the alkylene group of the N,N"-alkylenebisacrylamide is not specifically limited but is preferably 1 to 12, more preferably 1 to 4, even more preferably 1 to 2. A crosslinking agent in which oligoethyleneimine or oligoethylene glycol functions as a crosslinking agent chain in place of the alkylene group is also usable here.

The pKa regulator for use herein may be one capable of protonating or deprotonating the amino group in the monomer, and an acid such as hydrochloric acid or a base such as sodium hydroxide may be used after the concentration thereof is appropriately controlled in accordance with the intended pKa level. Depending on the crosslinking ratio by the crosslinking agent, the pKa of the polymer compound particles may be controlled, and therefore, the above-mentioned crosslinking agent may also be used as a pKa regulator.

Not specifically limited, the solvent for the particles preparing liquid may be a polar solvent such as water, methanol, ethanol, isopropanol, acetonitrile, N,N-dimethylformamide, or dimethylsulfoxide. A mixed solvent of two or more kinds of these polar solvents is also usable. Above all, water, or a mixed solvent of water and any other polar solvent is preferably used.

The amino group-having polymer compound particles may be gel particles swollen with a liquid, or may be dry particles (solid particles). In the gel particles, a gas may more efficiently dissolve in the liquid that the gel particles contain, and therefore the amino group inside the gel particles may also be made to efficiently contribute toward gas absorption.

(Gelling Polymer Particles Having Acidic Functional Group)

The gelling polymer particles for use in the present invention may also be gelling polymer particles having an acidic functional group in addition to the gelling polymer particles having a basic functional group such as an amino group, or may also be gelling polymer particles having both a basic functional group and an acidic functional group. The acidic functional group includes a carboxyl group and a sulfate group, and a carboxyl group is preferred. A polymer compound having a carboxyl group includes a polymer compound containing acrylic acid or methacrylic acid as the constituent monomer. The gelling polymer particles having an acidic functional group are preferably those composed of only a polymer compound having an acidic functional group, but may contain any other component. Regarding specific examples of the other component, the specific examples of the other component that the amino group-having polymer compound may contain, as described in the section of (gelling polymer particles containing amino group), may be referred to. Regarding the preparation method for the polymer compound particles having an acidic functional group, the contents described in the section of (preparation of amino group-having polymer compound particles) may be referred to, in which, however, the "amino group-having monomer" is replaced by "an acidic functional group-having monomer".

(Particle Size of Gelling Polymer Particles)

The particle size of the polymer compound particles having a gelling property (gelling polymer compound particles) for use in the present invention is preferably 5 nm to 10 µm in a dry state, more preferably 5 nm to 500 nm.

The hydrodynamic particle size of the polymer compound particles, after swollen in water, is preferably ten nm to a few dozen µm as a hydrodynamic diameter thereof measured in water according to a dynamic light scattering method, more preferably 10 nm to 50 µm, even more preferably 20 nm to 2 µm, and further more preferably 90 nm to 1 µm. The "particle size after swollen in water" of the polymer compound particles is a particle size thereof measured by immersing the dried polymer compound particles in water at 30° C. for 24 hours, and is a mean particle size measured according to a dynamic light scattering method.

(Liquid for Use for Gelling Polymer Particles)

Not specifically limited, the liquid that the gel particles contain may be a polar solvent such as water, methanol, ethanol, isopropanol, acetonitrile, N,N-dimethylformamide, or dimethyl sulfoxide, and may be a mixed solvent of two or more kinds of these polar solvents as combined. Above all, water or a mixed solvent prepared by mixing water and any other polar solvent is preferably used. Specifically, the gel particles are preferably hydrogel particles.

The water content in the gel particles is preferably 0.05 mL or more per gram of the solid content, more preferably 0.5 mL or more. Also preferably, the water content in the gel particles is 20 mL or less, more preferably 10 mL or less.

[Additive to Membrane]

The membrane containing gelling polymer particles having at least one of a basic functional group and an acidic functional group (the membrane of the present invention) may contain a polymer compound and an additive inside the gelling polymer particles in the membrane or in a region outside the gelling polymer particles.

Not specifically limited, the polymer compound except the gelling polymers is preferably a polymer compound reactive to stimulation such as temperature change. The reaction to stimulation includes change in acid dissociation constant of a functional group, conformational change, swelling degree change, hydrophilicity change, water content change, absorbability change, bicarbonate ion dissolution amount change, and hydrogen sulfide ion dissolution amount change. Also preferably, the polymer compound contains an amine whose conjugate acid dissociation constant is planned. In particular, for dissolving carbon dioxide, the acid dissociation constant of the amino group is preferably the same as or larger than the acid dissociation constant of carbonic acid. Above all, a secondary or tertiary amino group is preferred, and a tertiary amino group is more preferred. A dialkylamino group such as a dimethylamino group is more preferred. The amino group of the polymer compound may bond to the main chain or may bond to the side chain, but preferably bonds to the side chain.

The additive includes a membrane stabilizer, an absorption promoter, a desorption promoter, a moisture absorbent, and an antioxidant.

The membrane stabilizer includes a polymer compound, a polymerizable molecule (polymerizable compound), a crosslinking agent such as a titanium crosslinking agent, a primary amine, a secondary amine and a tertiary amine. Among these polymer compounds, a primary amino group-having polymer compound such as a polyvinylamine, a secondary amino group-having polymer compound, a tertiary amino group-having polymer compound, a quaternary ammonium group-having compound, a polymer compound having plural kinds of a primary amine group, a secondary amino group, a tertiary amino group and a quaternary ammonium group, a polyvinyl alcohol, a polyethylene, and a polyvinyl alcohol/polyethylene copolymer are preferably used.

In the case where a polymerizable molecule is used as a membrane stabilizer, a polymer compound formed through polymerization of the molecule in the membrane can also function as a membrane stabilizer. With that, even after water addition or gas absorption/desorption after membrane formation, the membrane does not excessively swell and can readily maintain a uniform membrane state. The polymerizable molecule includes a monomer having a polymerizable group, and examples thereof include a (meth)acryl monomer. Above all, a (meth)acrylamide or a (meth)acrylamide derivative is preferably used. For example, they include an alkylacrylamide, a substituted or unsubstituted aminoalkyl (meth)acrylamide, and an acrylamide derivative having two polymerizable groups. Among these, a substituted aminoalkylacrylamide and an acrylamide derivative having two polymerizable groups are preferably used. Preferably, a substituted aminoalkylacrylamide and an acrylamide derivative having two polymerizable groups are combined for use herein, and the molar fraction thereof is preferably (60 to 99)/(40 to 1), more preferably (80 to 99)/(20 to 1), even more preferably (90 to 99)/(10 to 1). Specific examples of the polymerizable group-having monomer include N-isopropylamylamide (NIPAM), tert-butylacrylamide (TRAM), N,N-dimethylaminopropylmethacrylamide (DMAPM), N,N'-methylenebisacrylamide (BIS), and acrylamide. One alone of these polymerizable compounds may be used singly, or two or more kinds thereof may be used as combined. In the case where two or more kinds are used in combination, for example, a combination of N,N-dimethylaminopropylmethacrylamide (DMAPM) and N,N'-methylenebisacrylamide (BIS) is a preferred example.

The content of the membrane stabilizer in the membrane of the present invention is preferably 1 to 89% by mass relative to the total amount of the membrane.

The absorption promoter is a compound having a function of promoting absorption of an acid gas by the membrane of the present invention. The desorption promoter is a compound having a function of promoting desorption of an acid gas from the gelling polymer particles. In the present invention, an absorption/desorption promoter having both functions of an absorption promoter and a desorption promoter may also be used. These absorption promoter, desorption promoter and absorption/desorption promoter may additionally have a function as a membrane stabilizer. The total content of the absorption promoter, the desorption promoter and the absorption/desorption promoter in the membrane of the present invention is preferably 0.05 mL or more per gram of the solid content, more preferably 0.1 mL or more. The water content in the gel particles is preferably 20 mL or less, more preferably 10 mL or less. The content of the absorption promoter in the membrane of the present invention is preferably 0.1 to 12 N as an amine concentration-equivalent amount thereof, more preferably 1 to 10 N, even more preferably 3 to 9 N.

As the absorption promoter, the desorption promoter and the absorption/desorption promoter, a low-molecular amine may be preferably used. The molecular weight of the low-molecular amine is preferably 61 to 10000, more preferably 75 to 1000, even more preferably 90 to 500. The boiling point of the low-molecular amine is preferably 80° C. or higher, more preferably 120° C. or higher, and even more preferably 150° C. or higher, from the viewpoint that the amine of the type is usable for a long period of time and is practicable. For boiling point elevation, an amine-containing compound that has a site of forming a salt with a counter ion like an ionic liquid and can be liquid may also be used.

The low-molecular amine may contain any of a primary amino group, a secondary amino group, a tertiary amino group, an ammonium group, and an imidazolium group, or may contain a plurality of an amino group, an ammonium group and an imidazolium group, and preferably contains 1 to 3 such groups. The secondary amino group and the tertiary amino group may be a cyclic amino group. Further, the low-molecular amine may contain any other functional group than an amino group, an ammonium group and an imidazolium group, and for example, may contain a hydroxyl group. Preferably, the low-molecular amine contains 0 to 2 hydroxyl groups. Preferred examples of the low-molecular amine include an amine having an amino group and a hydroxyl group, and an amine having three amino groups. More preferred examples of the low-molecular amine include an amine having a secondary amino group and a hydroxyl group. From the viewpoint that the acid gas desorption amount can be dramatically increased in a high concentration region and that the compound is suitable for repeated use, an amine having a boiling point of 150° C. or higher and having a secondary amino group and a hydroxyl group is especially preferred.

Specific examples of the low-molecular amine include compounds represented by the following formulae.

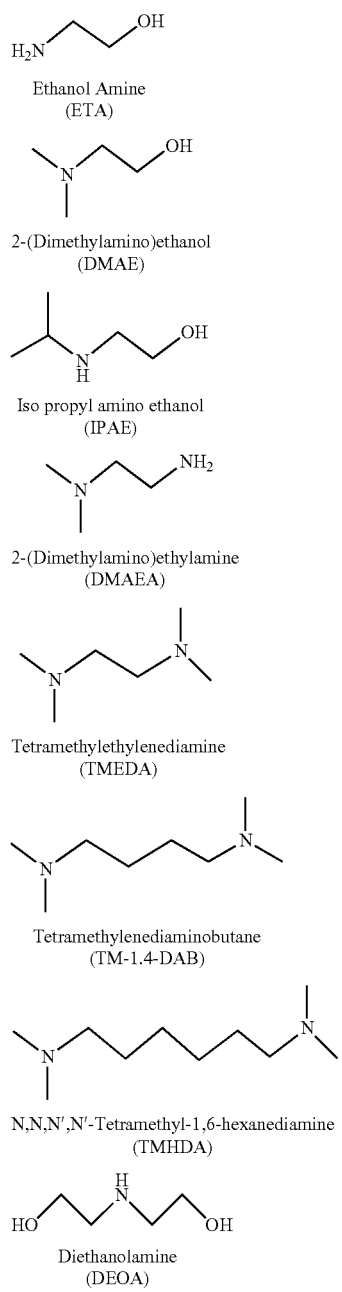

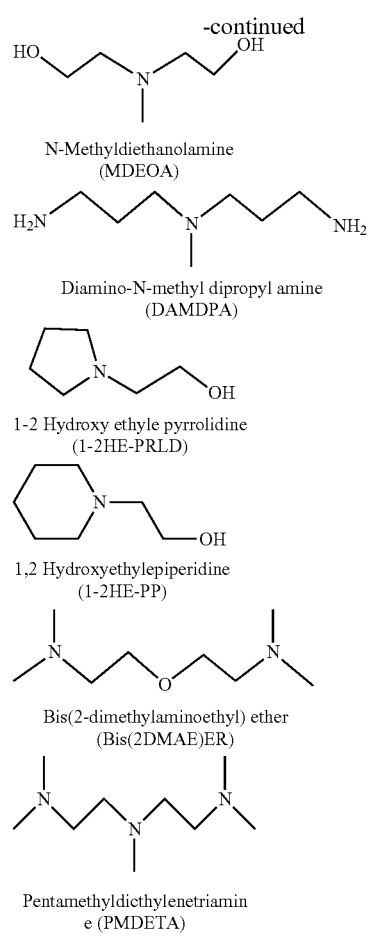

Among the above, use of DMAE, IPAE, Bis(2DMAE)ER, 1-2HE-PRLD, 1-2HE-PP, TM-1,4-DAB, TMHAD, or PMDETA is especially preferred from the viewpoint that the compound can increase the acid gas desorption amount. Above all, use of IPAE, Bis(2DMAE)ER, 1-2HE-PP, TM-1,4-DAB, TMHAD, or PMDETA is more preferred since the compound has a relatively high boiling point and hardly evaporates, use of IPAE, TM-1,4-DAB, TMHAD, or PMDETA is even more preferred since the acid gas desorption amount can be noticeably increased by increasing the concentration of the compound, and use of IPAE, TMHAD, or PMDETA is especially preferred since the compound is easily available.

The moisture absorbent usable as an additive is preferably one which, when formed into a saturated aqueous solution, may have a relative humidity at 25° C. of 90% or less. The moisture absorbent of the type includes ions such as a bromide ion, a chloride ion, an acetate ion, a carbonate ion, a bicarbonate ion, a lithium ion, a potassium ion, a calcium ion, a magnesium ion, and a sodium ion. The moisture absorbent of the type also includes salts such as lithium bromide, lithium chloride, calcium chloride, potassium acetate, magnesium chloride, potassium carbonate and sodium carbonate. In the case where a moisture absorbent is added, the amount thereof to be added is preferably 0.01 to 10% by mass relative to the total amount of the membrane.

The antioxidant usable as an additive is one capable of inhibiting or preventing oxidation by addition thereof. The antioxidant of the type includes vitamin C (ascorbic acid), vitamin E (tocopherol), BHT (dibutylhydroxytoluene), BHA (butylhydroxyanisole), sodium erythorbate, propyl gallate, sodium sulfite, sulfur dioxide, hydroquinone and derivatives thereof. In the case where an antioxidant is added, the amount thereof to be added is preferably 0.01 to 10% by mass relative to the total amount of the membrane.

One alone of the above-mentioned additives may be used singly, or two or more kinds thereof may be used in combination.

[Properties of Membrane]

The surface area of the monolayer membrane of the present invention is preferably 1 cm$^2$ or more. Also preferably, the nitrogen permeance at 40° C. through the monolayer membrane of the present invention is 100 GPU or less, more preferably 10 GPU or less. The carbon dioxide permeance at 40° C. through the monolayer membrane of the present invention is preferably 10 GPU or more, more preferably 100 GPU or more. The monolayer membrane with which the nitrogen permeance and the carbon dioxide permeance each fall within the above-mentioned range can make carbon dioxide permeate through the membrane selectively relative to nitrogen, and therefore when the membrane is used for a gas separation material to be mentioned below, it can selectively separate carbon dioxide from a mixed gas such as air containing nitrogen and carbon dioxide and can therefore efficiently recover carbon dioxide.

The "permeance" in this description is a value obtained according to the following equation (1):

$$Q = L/A \times \Delta P \quad (1)$$

In the equation (1), Q means a permeance, L means a permeation flow amount per unit time, A means a membrane area, and ΔP means a partial pressure difference between both sides of the monolayer membrane. The permeation flow amount L may be measured as the amount of the gas having permeated the membrane per unit time in gas chromatography or the like, and the unit of the permeance L is GPU (1 GPU is $1.0 \times 10^{-6}$ (cm$^3$(STP)/(s·cm$^2$·cm Hg)). The partial pressure difference ΔP may be determined by measuring, with use of a manometer and a gas chromatography or the like, the gas partial pressure on the gas supply side and the gas partial pressure on the gas permeation side followed by calculating the difference between the two.

In this description, the "selectivity" is a value of a ratio of the permeance, $Q_S$, of the gas having selectively permeated the membrane as a numerator to the permeance, $Q_O$, of the other gas as a denominator, $Q_S/Q_O$.

<Composite>

Next, the composite of the present invention is described.

The composite of the present invention has a porous carrier and gelling polymer particles having at least any one of a basic functional group and an acidic functional group and filling up the surface pores of the porous carrier.

Regarding the description and the preferred range of the "gelling polymer particles having at least any one of a basic functional group and an acidic functional group", the description given in the section of "gelling polymer particles having at least one of a basic functional group and an acidic functional group" for the monolayer membrane given hereinabove may be referred to.

[Porous Carrier]

The "porous carrier" in the present invention is a solid having a large number of fine pores inside it, and at least a part of the pores open to the surface of the porous carrier. In the present invention, among the pores that the porous carrier has, those opening to the surface of the porous carrier are referred to as "surface pores", and the inner diameter of the opening of the surface pores existing in the surface of the porous carrier is referred to as "open pore diameter". It is desirable that the surface pores in one surface may form as much as possible continuous pores with the inner pores and with the surface pores in the other surface so as to enable free gas permeation through the membrane.

Not specifically limited, the material of the porous carrier to constitute the composite is preferably a resin, more preferably a thermoplastic resin. Preferred examples of the thermoplastic resin include polyether sulfone (PES), polyvinylidene fluoride (PVDF), polytetrafluoroethylene (PTFE), cellulose mixture ester, nitrocellulose (NC), polyolefin, polyethylene, polypropylene, polymethylpentene, polyketone, polyimide, polystyrene, polymethyl methacrylate, polydimethylsiloxane, polyester, and nylon. These are excellent in mechanical strength and heat resistance and are favorably used as the porous carrier.

Preferably, the porous carrier has a hydrophilic group such as a OH group or a COOH group in the surface thereof. With that, the contact between gelling polymer particles and the porous carrier is bettered and a membrane containing gelling polymer particles can be thereby uniformly thrilled on the surface of the porous carrier. Such a hydrophilic group may be good to exist in at least the surface of the porous carrier that supports gelling polymer particles thereon (in the region where gelling polymer particles fill up the surface pores of the porous carrier), and may exist in the entire surface of the porous carrier or may exist only in the face thereof that supports gelling polymer particles. The hydrophilic group may be introduced into the porous carrier using a hydrophilic group-having resin as a material, or may be introduced thereinto through hydrophilization of the porous carrier. The hydrophilization includes plasma treatment and ozone treatment.

An interlayer may be arranged on the surface of the porous carrier. With that, gelling polymer particles can be stably fixed on the porous carrier. As the material for the interlayer, polydimethylsiloxane, silica porous fine particles, fumed silica and zeolite fine particles are preferably used. These have a function of fixing gelling polymer particles onto the surface of the porous carrier and are relatively excellent in carbon dioxide permeation performance, and therefore can exhibit the function of fixing particles thereon without detracting from the permeation performance and the selective permeability of the composite. By roughing the interlayer and by applying gelling polymer particles onto the thus-roughened interlayer, the surface area of the monolayer membrane can be increased.

Preferably, the size of the surface pores that the porous carrier has is smaller than the particle diameter of the gelling polymer particles to be applied onto the porous carrier. With that, the gelling polymer particles can be prevented from penetrating into the deep inside of the porous carrier and from running through the surface pores to be dropped off from the back of the porous carrier, and accordingly, the surface pores of the porous carrier can be more surely filled up by the gelling polymer particles.

The open pore diameter of the surface pores that the porous carrier has is preferably less than 2 μm, more preferably less than 0.5 μm, even more preferably less than 0.22 μm, and further more preferably less than 0.15 μm. The open pore diameter of the surface pores that the porous carrier has is preferably 0.01 μm or more. Also preferably, the maximum pore size of the porous carrier is less than 3 μm.

In this description, the "open pore diameter of surface pores" means a pore size measured as a maximum particle size capable of passing through the entire supporting membrane, and the "maximum pore size" is a maximum value of the pore size measured with a scanning electron microscope.

Preferably, the number of the surface pores of the porous carrier and the area occupied by the pores per the surface area thereof are larger. Also preferably, the pores inside the porous carrier exist as continuously as possible, and preferably the maximum volume is larger. With that, the gas permeance can be increased.

The shape of the porous carrier is preferably tabular or tubular, and preferably has a first face and a second face that are almost parallel to each other. More preferably, the surface pores in the first face are filled up with gelling polymer particles, and the surface pores in the second face are not filled up with gelling polymer particles. The dimension of the porous carrier may be appropriately selected depending on the use thereof, and for example, in the case where the porous carrier is used for the gas separation material to be mentioned below, the dimension thereof is selected depending on the amount of the supply gas to be treated.

FIG. 1 is a schematic perspective view showing a configuration example of a composite of the present invention. This composite has a porous carrier 13 formed of a pair of columnar porous materials 11 and 12, and a membrane 14 containing gelling polymer particles supported by one porous material 11. In this composite, the counterface 11a of one porous material 11 to the other porous material 12 constitutes the first face, and the counterface 12a of the other porous material 12 to the one porous material constitutes the second face, and the surface pores of the first face 11a of the one porous material 11 are filled up with the gelling polymer particles that the membrane 14 supported on the face contains.

[Configuration State of Gelling Polymer Particles]

Gelling polymer particles to constitute the composite are so arranged as to fill up the surface pores of the porous material. Regarding the surface pores each filled up by gelling polymer particles, each pore may be filled up by one gelling polymer particle, or may be filled up by two or more gelling polymer particles. Preferably, the region in which gelling polymer particles till up the surface pores of the porous carrier is 1 cm² or more.

Preferably, gelling polymer particles are supported on the surface of the porous carrier in such a state that the particles form a monolayer membrane to fill up the surface pores. Regarding the description, preferred range and specific examples of the monolayer membrane formed by gelling polymer particles, the contents described in the section of <monolayer membrane> given hereinabove may be referred to. Since gelling polymer particles form a monolayer membrane, the composite of the present invention can function as a separation material that separates the gas or liquid having selectively permeated the monolayer membrane from any other component.

[Properties of Composite]

Preferably, the composite of the present invention is such that the mean square roughness of the composite surface having gelling polymer particles is 5 μm or less. Here, "mean square roughness" is a root mean square roughness Rg defined in JIS B0601. On the surface of the type, gelling polymer particles exist uniformly to prevent any other component than the separation target from running through the gelling polymer particles to penetrate the porous carrier. Accordingly, the separation target of gas or liquid can be well selectively separated from the other components.

Preferably, the composite of the present invention is such that the nitrogen permeance at 40° C. through the filled region (region in which gelling polymer particles have filled up the surface pores of the porous carrier) therein is 100 GPU or less, more preferably 10 GPU or less. Also preferably, the composite of the present invention is such that the carbon dioxide permeance at 40° C. through the filled region (region in which gelling polymer particles have filled up the surface pores of the porous carrier) therein is 10 GPU or more, more preferably 100 GPU or more. The composite where the nitrogen permeance and the carbon dioxide permeance each fall within the above-mentioned range can make carbon dioxide selectively permeate therethrough relative to nitrogen, and therefore, when the composite is used as a gas separation material to be mentioned below, it can selectively separate carbon dioxide from a mixed gas such as air that contains nitrogen and carbon dioxide, and can efficiently recover it. Regarding the permeance, the method for determining the permeance as described in the section of "properties of monolayer membrane" given hereinabove may be referred to.

<Gas Separation Material>

The gas separation material of the present invention is characterized by containing the composite of the present invention.

Regarding the description, preferred range and specific examples of the gas separation material of the present invention, the contents described in the section of <composite> given hereinabove may be referred to.

The gas to be subjected to gas separation with the gas separation material of the present invention is a mixed gas. Preferably, the mixed gas contains two or more kinds of gas components, and at least one kind thereof is a gas capable of selectively permeating through the region where gelling polymer particles have filled up the surface pores of a porous carrier (hereinafter referred to as "pores filled region") (hereinafter the gas is referred to as "selectively permeative gas"), specifically a gas capable of permeating through the pores filled region at a larger permeance than the other gases. When a mixed gas of such a selectively permeative gas and other gases is supplied to the pores filled region, the selectively permeative gas selectively permeates through the pores filled region to flow into the surface pores of a porous material, and then after having run through the surface pores, the gas is discharged outside. At this time, the other gases almost remain on the side opposite to the side through which the selectively permeative gas has been discharged out, and therefore the selectively permeative gas can be thus selectively separated from the other gases. The mechanism of the gas separation is presumed to be as follows.

Specifically, it is considered that the gas selectively permeates through the pores filled region can more readily dissolve in the gelling polymer particles than the other components of the mixed gas. Consequently, when a mixed gas of the selectively permeative gas and other gases is supplied to the pores filled region, the selectively permeative gas may selectively dissolve in the gelling polymer particles. The selectively permeative gas thus having dissolved in the gelling polymer particles diffuses toward the side of the surface pores and passes through the surface pores owing to the partial pressure difference between the mixed gas supply side and the side of the surface pores, and is then discharged outside. According to this mechanism, the other gases do not pass through the surface pores of the porous material and almost remain on the mixed gas supply side, while the selectively permeative gas passes through the surface pores of the porous material and is discharged out on the side opposite to the mixed gas supply side. Accordingly, it is presumed that the selectively permeative gas can be selectively separated from the other gases.

Using the gas separation material, gas separation can be carried out while a mixed gas is continuously supplied thereto, and a target gas to be separated can be efficiently recovered without any troublesome labor.

Preferably, the gas separation material of the present invention is such that an acid gas can selectively permeate it, more preferably a gas of carbon dioxide or hydrogen sulfide can selectively permeate it, and even more preferably carbon dioxide can selectively permeate it. The membrane containing gelling polymer particles for use in the present invention has a high permeation performance to an acid gas and is excellent in selective permeability relative to other gases. Consequently, the membrane can efficiently separate an acid gas from a mixed gas.

The mixed gas to be subjected to gas separation with the gas separation material of the present invention includes a natural gas, a bio gas, a landfill gas, a gas after combustion, a fuel gas, and a gas after steam reforming. Using the gas separation material of the present invention, for example, carbon dioxide can be well selectively separated from such a mixed gas to thereby noticeably lower the carbon dioxide concentration in the mixed gas.

In addition, the gas separation material of the present invention can make not only gas but also water or steam selectively permeate through it. Accordingly, for example, the gas separation material can separate water or steam from water or steam that contains a gas, in other words, it can remove gas from water or steam.

The condition in gas separation may vary depending on various conditions such as the gelling polymer compound particles for use in the gas separation material, the composition of the mixed gas to be subjected to gas separation, and the target gas to be separated from a mixed gas. Preferably, the gas separation is carried out at a temperature of 0 to 130° C., more preferably 0 to 95° C., even more preferably 10 to 60° C. Also preferably, the water amount in the monolayer membrane for gas separation is 1% by mass to 1000% by mass of the dry membrane weight.

The gas separation material of the present invention may be formed of one composite, or two or more composites. In the case where the gas separation material is formed of two or more composites, preferably, plural composites are connected in series. For example, in the case where composites shown in FIG. 1 are used, the opposite surface to the second face 12a of the porous material 12 having the second face 12a is bonded to the opposite surface to the first face 11a of the porous material 11 having the first face 11a, thereby producing a gas separation material of two composites connected in series, and the bonding step may be further repeated to construct a gas separation material of 3 or more composites connected in series.

<Filter and Gas Separation Device>

The filter and the gas separation device of the present invention are characterized by having the gas separation material of the present invention.

Regarding the description, preferred range and specific examples of the filter and the gas separation device, the contents described in the foregoing section of <gas separation material> may be referred to.

The filter and the gas separation device of the present invention use the gas separation material of the present invention, and therefore can efficiently separate and recover a selectively permeative gas from a mixed gas.

<Method for Producing Composite>

The method for producing a composite of the present invention includes a step of swelling gelling polymer particles of a polymer compound having at least one of a basic functional group and an acidic functional group with a liquid, applying them onto one surface of a porous carrier, and drying them. The composite to be produced according to the production method of the present invention is preferably the composite of the present invention.

Regarding the description, preferred range and specific examples of the "gelling polymer particles of a polymer compound having at least one of a basic functional group and an acidic functional group" for use in the production method, the description in the section of [gelling polymer particles of a polymer compound having at least one of a basic functional group and an acidic functional group] in the monolayer membrane described hereinabove may be referred to, and regarding the description, preferred range and specific examples of the "porous carrier", the description in the section of "porous carrier" in the composite described hereinabove may be referred to. In the following description, the liquid material prepared by "swelling gelling polymer particles of a polymer compound having at least one of a basic functional group and an acidic functional group with a liquid" will be referred to as "particle dispersion".

The liquid to swell the gelling polymer particles is preferably water or a polar solvent. Regarding the specific examples of the polar solvent, the specific examples of the polar solvent described in the section of (preparation of amino group-having polymer compound particles) for the monolayer membrane given hereinabove may be referred to.

Examples of a method of applying a particle dispersion onto one surface of a porous carrier includes a spray coating method, a spin coating method, a casting method, a microgravure coating method, a gravure coating method, a bar coating method, a roll coating method, a wire bar coating method, and a dip coating method. A spray coating method, a dip coating method, a filtration method, a bar coating method or a wet coating method is preferably used, and a spray coating method is more preferably used. Coating with a particle dispersion is preferably carried out plural times via a drying step between the coating steps. By varying the coating frequency, the thickness of the membrane to be formed can be controlled accurately.

At this time, preferably, the particle dispersion is applied under the condition that the gelling polymer particles applied onto one face of a porous carrier do not run through the porous carrier to go outside from a different face thereof. For example, when a porous carrier where the pore size of the surface pores becomes smaller toward the inside of the porous carrier, or a porous carrier where the surface pores have such a varying pore size that gelling polymer particles could not run (pass) through the pore at any site from the opening of the pore to the back end thereof is used, gelling polymer particles can be prevented from running outside through the porous carrier. Preferably, the particle size of the gelling polymer particles in coating is 100 to 1000 nm.

Also preferably, a long sheet-like porous carrier is used and a particle dispersion is applied thereto while the porous carrier is unwounded from the roll thereof, and after the coating film of the particle dispersion is dried, the porous carrier is again rolled up to produce a composite. In that manner, a composite can be continuously efficiently produced.

EXAMPLES

The characteristic features of the present invention are described more specifically with reference to Examples and Comparative Examples given hereunder. In the following Examples, material used, its amount and ratio, the details of the treatment and the treatment process may be suitably modified or changed not overstepping the spirit and the scope of the invention. Accordingly, the scope of the invention should not be limitatively interpreted by the Examples mentioned below.

[Synthesis of Gelling Polymer Particles]

Synthesis Example 1

Synthesis of Dimethylamino Group-Having Gelling Polymer Particles (Particle Size 235 nm)

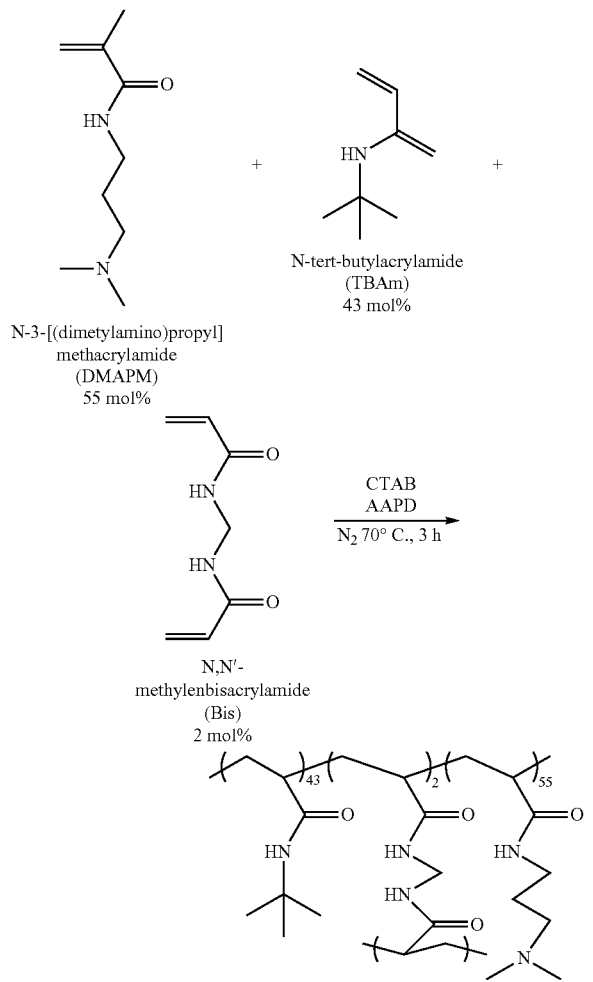

One liter of pure water was added to a 2-liter three-neck flask, heated at 70° C., and then 2 mM of a surfactant (cetyltrimethylammonium bromide) and three kinds of monomers were dissolved therein in such a manner that the total monomer concentration could be 312 mM. The composition of the three kinds of monomers is 55 mol % of N-(dimethylaminopropyl)methacrylamide, 43 mol % of N-tert-butylacrylamide and 2 mol % of N,N'-methylenebisacrylamide. Before use herein, N-(dimethylaminopropyl) methacrylamide was processed through an alumina column to remove the polymerization inhibitor. N-tert-butylacrylamide was previously dissolved in a small amount of methanol to be a 0.68 g/mL solution. The mixture was, while kept at 70° C., stirred with a mechanical stirrer, and bubbled with nitrogen for 1 hour to remove oxygen from the system. To the resultant monomer solution, a solution prepared by dissolving 700 mg of 2,2'-azobis(2-methylpropionamidine) dihydrochloride in 5 mL of pure water was added, and reacted in a nitrogen atmosphere at 70° C. for 3 hours. After the reaction, the precipitate was collected by filtration, and dialyzed through a dialysis membrane (MWCO12-14.000, width: 75 mm, vol/length: 18 mL/mL) [manufactured by Spectrum Laboratories Inc.) for 3 days to remove the unreacted monomers and the surfactant. Using a strong basic ion-exchange resin, the counter anion was removed from the dialyzed precipitate and the resultant precipitate was freeze-dried to give gelling polymer particles 1. The material not processed for dialysis or ion exchange was also tested almost in the same manner as above, and was confirmed to have almost the same function. The mean particle size (hydrodynamic diameter) of the resultant gelling polymer particles 1 was 235 nm when swollen in water at 30° C., and was 218 nm when swollen in water at 40° C.

Synthesis Example 2

Synthesis of Dimethylamino Group-Having Gelling Polymer Particles (Particle Size 89 nm)

Gelling polymer particles 2 were synthesized in the same manner as in Synthesis Example 1 except that N-(dimethylaminopropyl)methacrylamide was 5 mol %, N-tert-butylacrylamide was 0 mol %, N-isopropylacrylamide was 93 mol %, N,N'-methylenebisacrylamide was 2 mol % and the total monomer concentration was 78 mM. The mean particle size (hydrodynamic diameter) of the resultant gelling polymer particles 2 was 89 nm when swollen in water at 30° C., and was 85 nm when swollen in water at 40° C.

Synthesis Examples 3 to 12

Synthesis of Gelling Polymer Particles Having Different pKa

Gelling polymer particles 3 to 5 were synthesized in the same manner as in Synthesis Example 1 except that a monomer represented by the following formula (basic functional group-having monomer) was used in place of N-(dimethylaminopropyl)methacrylamide.

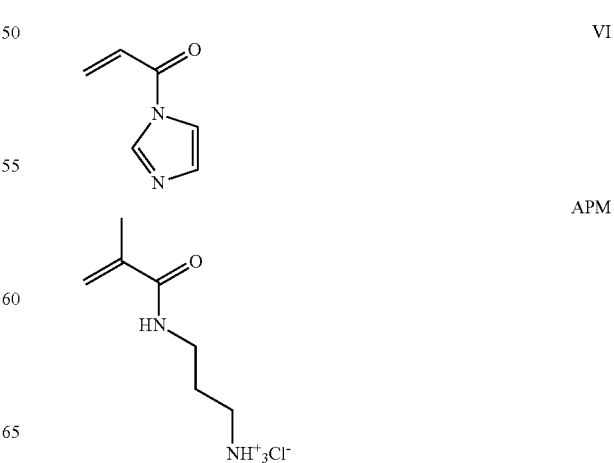

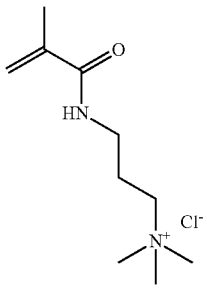

QAA

Apart from these, various gelling polymer particles 6 to 12 having a different amino group protonation rate (various gelling polymer particles having a different pKa) were synthesized according to the same process as in Synthesis Example 1 except that a different concentration of hydrochloric acid or sodium hydroxide was introduced to the mixture to be polymerized, for controlling the amino group protonation.

The basic functional group-having monomer component used in each Synthesis Example, pKa of the synthesized gelling polymer particles 3 to 12, the amine amount thereof (the amount of the structural unit corresponding to the amino group-having monomer) and the particle size thereof are shown in Table 1. In Table 1, pKa is a value measured by neutralization titration at 40° C., and the amine amount is a value measured by neutralization titration at 30° C. The particle size is a mean particle size of the particles swollen in water at 40° C. and measured according to a dynamic light scattering method.

ticle size (hydrodynamic diameter) of the resultant gelling polymer particles 13 was 300 nm when swollen in water at 30° C., and pKa (30° C.) thereof by neutralization titration (30° C.) was 6.6.

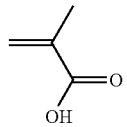

[Porous Material]

The porous materials used in this Example are a porous material of polyether sulfone (PES) (manufactured by Sartorius Corporation: pore size 0.1 μm, 0.22 μm, 0.45 μm), a porous material of polyvinylidene fluoride (PVDF) (manufactured by Millipore Corporation: pore size 0.1 μm), a porous material of nitrocellulose (NC) (manufactured by Millipore Corporation: pore size 0.025 μm, 0.1 μm, 0.22 μm), an ultrafiltration membrane (manufactured by Sartorius Corporation: molecular weight cut-off 10 k, 50 k, 300 k), and a porous material of ultra-high-molecular polyethylene (manufactured by Entegris Corporation: pore size 0.05 μm). The pore size of the porous material referred to herein is a maximum particle size capable of passing through the entire supporting membrane. FIG. 2 shows scanning electron microscope photographs of the surfaces of typical porous materials used in this Example. In each drawing in this Example, "PES" represents a porous material of polyether sulfone, "PVDF" represents a porous material of polyvinylidene fluoride, "NC" represents a porous material of

TABLE 1

| Synthesis Example No. | Gelling Polymer Particles No. | Basic Functional Group-Having Monomer Component | pKa | Amine Amount (μmol/g) | Particle Size (nm) |
|---|---|---|---|---|---|
| Synthesis Example 3 | Gelling Polymer Particles 3 | QAA | — | 352 | 241 |
| Synthesis Example 4 | Gelling Polymer Particles 4 | APM | 8.76 | 424 | 245 |
| Synthesis Example 5 | Gelling Polymer Particles 5 | VI | 4.34 | 628 | 75 |
| Synthesis Example 6 | Gelling Polymer Particles 6 | DMAPM | 7.23 | 413 | 214 |
| Synthesis Example 7 | Gelling Polymer Particles 7 | DMAPM | 6.87 | 438 | 336 |
| Synthesis Example 8 | Gelling Polymer Particles 8 | DMAPM | 6.63 | 438 | 475 |
| Synthesis Example 9 | Gelling Polymer Particles 9 | DMAPM | 6.52 | 413 | 825 |
| Synthesis Example 10 | Gelling Polymer Particles 10 | DMAPM | 8.26 | 363 | 119 |
| Synthesis Example 11 | Gelling Polymer Particles 11 | DMAPM | 7.55 | 388 | 153 |
| Synthesis Example 12 | Gelling Polymer Particles 12 | DMAPM | 5.88 | 400 | 237 |

Synthesis Example 13

Synthesis of Carboxyl Group-Having Gelling Polymer Particles

Gelling polymer particles 13 were synthesized in the same manner as in Synthesis Example 1 except that methacrylic acid represented by the following formula was sued in place of N-(dimethylaminopropyl)methacrylamide. The mean parnitrocellulose, "UF" represents an ultrafiltration membrane, and "UPE" represents a porous material of ultra-high-molecular polyethylene.

[Measurement of Gas Permeation Performance]

For measuring the gas permeation performance of composites, a gas permeation performance measuring device shown in FIG. 3 is used.

The gas permeation performance measuring device shown in FIG. 3 has a thermostat bath 21 capable of housing a composite sample under a constant condition, a supply gas delivery line 22, a sweep gas delivery line 23 and a gas chromatograph 24. The supply gas delivery line 22 has a nitrogen supply source 25, a carbon dioxide supply source 26 and a humidifier 27, and is so configured that a mixed gas (supply gas) of nitrogen supplied from the nitrogen supply source 25 and carbon dioxide supplied from the carbon dioxide supply source 26 mixed in a predetermined ratio is humidified in the humidifier 27, and then delivered toward a composite sample 1*a*. The sweep gas delivery line 23 has a helium gas supply source 28 and a humidifier 29, and is so configured that helium gas (sweep gas) supplied from the helium gas supply source 28 is humidified in the humidifier 29, and then delivered toward the composite sample 1*a*. The humidifiers 27 and 29 that the supply gas delivery line 22 and the sweep gas delivery line 23 have are bubbler-type humidifiers that humidify the gases introduced into the humidifiers 27 and 29 by introducing them through water, and the relative humidity of the humidified gas is controlled by the water temperature. The gas chromatograph 24 is so configured that the components of the gas discharged from the measurement sample are separated and the partial pressure thereof is detected. In this Example, based on the data given by the gas chromatograph 24, the permeance and the selectivity of each component of the discharged gas are calculated.

The composite sample to be measured for estimation of the permeation performance thereof by the gas permeation performance measuring device is, for example, as shown in FIG. 1, a laminated material having a pair of porous materials 11 and 12, in which a membrane 14 containing gelling polymer particles is provided on the first face 11*a* of one porous material 11 and the other porous material 12 is laminated on the membrane 14. For measuring the permeation performance of the composite sample 1*a*, the composite sample 1*a* is conveyed into the thermostat bath 21, a sweep gas delivery line 23 and the gas chromatograph 24 are connected to predetermined sites of one porous material 11 while the supply gas delivery line 22 is connected to a predetermined site of the other porous material 12. Accordingly, the gas delivered from the supply gas delivery line 22 (humidified mixed gas of nitrogen and carbon dioxide) permeates the porous material 12 and is supplied to the membrane 14, and each gas component of the mixed gas permeates the membrane 14 in accordance with the permeation performance of the membrane 14, then moves inside the porous material 11 along the helium gas flow therein and is discharged out toward the gas chromatograph 24. The partial pressure of each component of the discharged gas reflects the permeation performance of the membrane, and therefore based on the partial pressure, the permeance of each component can be calculated and the membrane permeation performance can be thereby evaluated.

In measurement in this Example, the nitrogen flow rate was 90 mL/min and the carbon dioxide flow rate was 10 mL/min in the supply gas delivery line 22, the helium gas flow rate was 10 mL/min in the sweep gas delivery line, and the thermostat bath was kept at 1 atmosphere and 40° C. The gas flow rate is a flow rate at 1 atmosphere and 20° C. (standard state). Unless otherwise specifically indicated, the humidifier temperature (water temperature) is 41° C.

[Production and Evaluation of Membrane and Composite Containing Gelling Polymer Particles]

Comparison Between Membrane Containing Gelling Polymer Particles and Membrane Containing Linear Polymer The gelling polymer particles 1 synthesized in Synthesis Example 1 were dispersed and swollen in water to prepare a particle dispersion having a concentration of the gelling polymer particles of 1 mg/mL. Thus prepared, the particle dispersion was applied onto the surface of a porous material of polyether sulfone having a pore size of 0.1 μm according to a spray coating method to form a membrane having a thickness of 520 nm (membrane containing the gelling polymer particles 1), and a porous material of polyether sulfone having a pore size of 0.1 μm was laid thereon to be a composite. Here, the membrane formation according to the spray coating method was repeated for a total of 12 times each interposed by a drying step.

Apart from this, a linear polymer was synthesized in the same manner as in Synthesis Example 1 except that N,N'-methylenebisacrylamide was not used, and dissolved in water to prepare a polymer solution having a concentration of 1 mg/mL. The polymer solution was applied onto the surface of a porous material of polyether sulfone having a pore size of 0.1 μm according to a spray coating method to form a membrane (membrane containing the linear polymer), and a porous material of polyether sulfone having a pore size of 0.1 μm was laid thereon to be a composite (comparative composite 1). Here, the membrane formation according to the spray coating method was repeated for a total of 12 times each interposed by a drying step.

FIG. 4 shows scanning electron microscope photographs of the surfaces of the membrane formed using the particle dispersion (membrane containing the gelling polymer particles 1) and the membrane formed using the polymer solution (membrane containing the linear polymer). FIG. 5 shows data of a nitrogen permeance, a carbon dioxide permeance and a selectivity ($CO_2/N_2$) of the formed composite and the comparative composite 1. In FIG. 5, the bar chart indicates a permeance and the round black indicates a selectivity ($CO_2/N_2$).

As shown in FIG. 5, the selectivity ($CO_2/N_2$) of the composite formed using the membrane containing the gelling polymer particles 1 is markedly higher than that of the comparative composite 1 formed using the membrane containing the linear polymer, that is, the former has excellent selective permeability to carbon dioxide.

Comparison between Membrane Containing Amino Group-Having Gelling Polymer Particles 1 and Membrane Containing Gelling Polymer Particles not having Amino Group The gelling polymer particles 1 synthesized in Synthesis Example 1 were dispersed and swollen in water to prepare a particle dispersion having a concentration of the gelling polymer particles 1 of 16 mg/mL. Thus prepared, the particle dispersion was applied onto the surface of a porous material of polyether sulfone having a pore size of 0.1 μm according to a spray coating method to form a membrane having a thickness of 2 μm (membrane containing the gelling polymer particles 1), and a porous material of polyether sulfone having a pore size of 0.1 μm was laid thereon to be a composite. Here, the membrane formation according to the spray coating method was repeated twice as interposed by a drying step.

Apart from this, gelling polymer particles (gelling polymer particles not having an amino group) were synthesized in the same manner as in Synthesis Example 1 except that the charge-in quantity of N-(dimethylaminopropyl)methacrylamide (DMAPM) was changed to 0 mol %, and the charge-in quantity of N-tert-butylacrylamide was changed to 98 mol %. A comparative composite 2 was produced in the same manner as that for the composite to be compared here, except that the gelling polymer particles synthesized here were used in place of the gelling polymer particles 1.

FIGS. 6 and 7 show data of a change with time of the nitrogen permeance, the carbon dioxide permeance and the selectivity ($CO_2/N_2$) of the produced composite and the comparative composite 2.

As shown in FIG. 6, the composite using the amino group-having gelling polymer particles 1 kept the carbon dioxide permeance of 120 to 130 GPU and the selectivity of 25 to 30 for a long period of time (10 hours or more). On the other hand, the comparative composite 2 using the gelling polymer particles not having an amino group exhibited little difference between the nitrogen flux and the carbon dioxide flux, and did not have selective permeability to carbon dioxide at all.

Comparison Relating to Thickness of Membranes Containing Gelling Polymer Particles The gelling polymer particles 1 synthesized in Synthesis Example 1 were dispersed and swollen in water to prepare a particle dispersion having a concentration of the gelling polymer particles of 16 mg/mL or 1 mg/mL. Thus prepared, each particle dispersion was applied onto the surface of a porous material of polyether sulfone having a pore size of 0.1 μm according to a spray coating method to form a membrane (membrane containing the gelling polymer particles), and a porous material of polyether sulfone having a pore size of 0.1 μm was laid thereon to be a composite. At this time, the membrane formation according to the spray coating method was repeated plural times each interposed by a drying step, and the coating frequency was changed to control the thickness of the membrane to be formed. Accordingly, various composites differing in the thickness of the membrane containing the gelling polymer particles were produced. The coating frequency in the case where the particle dispersion having a concentration of 16 mg/mL was used and the thickness of the formed membrane are shown in Table 2, and the coating frequency in the case where the particle dispersion having a concentration of 1 mg/mL was used and the thickness of the formed membrane are shown in Table 3.

TABLE 2

| | Concentration of Particle Dispersion 16 mg/mL Coating Frequency | | | | | |
|---|---|---|---|---|---|---|
| | 1 | 2 | 3 | 6 | 18 | 36 |
| Membrane Thickness (μm) | 0.7 | 1.3 | 2 | 4 | 12 | 24 |

TABLE 3

| | Concentration of Particle Dispersion 1 mg/mL Coating Frequency | | | | |
|---|---|---|---|---|---|
| | 3 | 6 | 9 | 12 | 14 |
| Membrane Thickness (nm) | 130 | 260 | 390 | 520 | 610 |

FIG. 8 shows scanning electron microscope photographs of the surfaces of the membranes formed using the particle dispersion having a concentration of 16 mg/mL, and FIG. 9 shows scanning electron microscope photographs of the surfaces of the membranes formed using the particle dispersion having a concentration of 1 mg/mL.

FIG. 10 shows a thickness dependence of the nitrogen permeance, the carbon dioxide permeance and the selectivity ($CO_2/N_2$) of the composite produced using the particle dispersion having a concentration of 16 mg/mL, as measured at a humidifier temperature of 39° C. and at a relative humidity of the mixed gas and the helium gas of 90%; and FIG. 11 shows a thickness dependence of the nitrogen permeance, the carbon dioxide permeance and the selectivity ($CO_2/N_2$) of the composite produced using the particle dispersion having a concentration of 1 mg/mL, as measured in 100 minutes after the start of the measurement at a humidifier temperature of 41° C. and at a relative humidity of the mixed gas and the helium gas of 95%.

FIG. 10 is referred to, in which the carbon dioxide permeance and the selectivity ($CO_2/N_2$) tend to increase with the reduction in the thickness of the membrane containing a gelling polymer compound, and in particular, in a thickness range of less than 5 μm, the values rapidly increase. From this, it is known that, for attaining a high carbon dioxide permeance and a high selectivity ($CO_2/N_2$), the thickness of the membrane containing a gelling polymer compound needs to be less than 5 μm.

Discussion of pKa of Gelling Polymer Particles

The gelling polymer particles 3 to 12 synthesized in Synthesis Examples 3 to 12 were individually dispersed and swollen in water to prepare particle dispersions each having a concentration of the gelling polymer particles of 1 mg/mL. Thus prepared, each particle dispersion was applied onto the back surface of a porous material of nitrocellulose having a pore size of 0.1 μm according to a spray coating method to form a membrane (membrane containing any of the gelling polymer particles 3 to 12), and a porous material of nitrocellulose having a pore size of 0.1 μm was laid thereon to produce various composites differing in the kind of the gelling polymer particles therein. At this time, the membrane formation according to the spray coating method was repeated plural times each interposed by a drying step, and the coating frequency was changed to control the thickness of the membrane to be formed. Accordingly, various composites differing in the thickness of the membrane containing different gelling polymer particles were produced.

The nitrogen permeance, the carbon dioxide permeance and the selectivity ($CO_2/N_2$) of each of the thus-produced composites were measured at a relative humidity of the mixed gas and the helium gas of less than 90%. FIG. 12 shows a pKa dependence of the nitrogen permeance, the carbon dioxide permeance and the selectivity ($CO_2/N_2$) of the composite where the gelling polymer particles-containing membrane was formed to have a thickness of 260 nm; and FIG. 13 shows a graph of the results drawn by plotting the carbon dioxide permeance through relative to the reciprocal of the thickness of the gelling polymer particles-containing membrane.

From FIG. 12, it is known that the maximum permeance of carbon dioxide varies depending on the pKa of the gelling polymer particles in the membrane, that the maximum permeance is great within a pKa range of more than 6 and less than 8, and that the maximum permeance is especially great within a pKa range of 6 to 7.

Evaluation of Membrane Containing Carboxyl Group-Having Gelling Polymer Particles The carboxyl group-having gelling polymer particles 13 synthesized in Synthesis Example 13 were dispersed and swollen in water to prepare a particle dispersion having a concentration of the gelling polymer particles 13 of 1 mg/mL. Thus prepared, the particle dispersion was applied onto the back surface of a porous material of nitrocellulose having a pore size of 0.1 μm according to a spray coating method to form a membrane having a thickness of 260 nm (membrane containing the gelling polymer particles 13), and nitrocellulose having a pore size of 0.1 µm was laid thereon to be a composite. Here, the membrane formation according to the spray coating method was repeated for a total of 6 times each interposed by a drying step.

FIG. 14 shows a change with time of the nitrogen permeance, the carbon dioxide permeance and the selectivity ($CO_2/N_2$) of the composite produced here.

From FIG. 14, it is known that also the composite using the carboxyl group-having gelling polymer particles can have a high selectivity ($CO_2/N_2$) of 20 to 30.

Discussion of Particle Size of Gelling Polymer Particles

The gelling polymer particles 1 synthesized in Synthesis Example 1 (having a hydrodynamic diameter of 235 nm when swollen in water at 30° C.) or the gelling polymer particles 2 synthesized in Synthesis Example 2 (having a hydrodynamic diameter of 89 nm when swollen in water at 30° C.) were dispersed and swollen in water to prepare a particle dispersion having a concentration of the gelling polymer particles of 1 mg/mL. Thus prepared, each particle dispersion was applied onto the surface of a porous material of polyether sulfone having a pore size of 0.1 µm according to a spray coating method to form a membrane (membrane containing the gelling polymer particles 1 or 2). Here, the membrane formation according to the spray coating method was repeated for a total of 12 times each interposed by a drying step.

FIG. 15 shows scanning electron microscope photographs of the surface of each membrane formed. From FIG. 15, it is known that the membrane containing the gelling polymer particles 1 having a particle size of 235 nm has fewer defects and is better than the membrane containing the gelling polymer particles 2 having a particle size of 89 nm. In addition, the carbon dioxide permeance and the selectivity ($CO_2/N_2$) of the membrane formed using the gelling polymer particles 1 are higher than those of the membrane formed using the gelling polymer particles 2. This indicates that the particle size of the gelling polymer particles is preferably more than 89 nm.

Effect of Amine Addition to Membrane Containing Gelling Polymer Particles

The gelling polymer particles 1 synthesized in Synthesis Example 1 were dispersed and swollen in water while an amine of 2-(isopropylamino)ethanol was added thereto at a different concentration to prepare various amine-containing particle dispersions having a concentration of the gelling polymer particles 1 of 1 mg/mL and having a different amine concentration. Thus prepared, each amine-containing particle dispersion was applied onto the back surface of a porous material of polyether sulfone having a pore size of 0.1 µm according to a spray coating method to form a membrane (membrane containing the gelling polymer particles 1 and the amine) having a thickness of 2 µm, and a 0.1-µm porous material of polyether sulfone was laid thereon to produce various composites where the membrane has a different amine concentration. Here, the membrane formation according to the spray coating method was repeated for a total of 6 times each interposed by a drying step.

The nitrogen permeance, the carbon dioxide permeance and the selectivity ($CO_2/N_2$) of the produced composites were measured. FIG. 16 shows an amine concentration dependence of the permeation performance, and FIG. 17 shows a change with time of the nitrogen permeance, the carbon dioxide permeance and the selectivity ($CO_2/N_2$) of the composite produced using the amine-containing particle dispersion having an amine concentration of 66.6 mg/mL.

From FIGS. 16 and 17, it is known that amine addition to the gelling polymer particles-containing membrane increases the carbon dioxide permeance and the selectivity ($CO_2/N_2$) and that the permeation performance can be maintained for 200 minutes or more.

Discussion of Ingredient and Pore Size of Porous Material (a) Evaluation of Composite Using Porous Material of Polyvinylidene Fluoride or Polyether Sulfone The gelling polymer particles 1 synthesized in Synthesis Example 1 were dispersed and swollen in water to prepare a particle dispersion having a concentration of the gelling polymer particles of 1 mg/mL. Thus prepared, the particle dispersion was applied onto the surface of a porous material of polyvinylidene fluoride (PVDF) having a pore size of 0.1 µm or the surface of a porous material of polyether sulfone (PES) having a pore size of 0.1 µm according to a spray coating method to form a membrane (membrane containing the gelling polymer particles 1) having a thickness of 260 nm, and a porous material formed of the same ingredient and having a pore size of 0.1 µm was laid thereon to produce two kinds of composites differing in the porous material therein. Here, the membrane formation according to the spray coating method was repeated for a total of 6 times each interposed by a drying step.

FIG. 18 shows scanning electron microscope photographs of the surface of the membrane formed on each porous material. FIG. 19 shows the nitrogen permeance and the carbon dioxide permeance of each produced composite. As in FIG. 19, the carbon dioxide permeance was higher than the nitrogen permeance in any case where the membrane was formed on any porous material, and the porous materials tested here exhibited excellent selective permeability.

(b) Evaluation of Composite using Ultrafiltration Membrane as Porous Material

The gelling polymer particles 1 synthesized in Synthesis Example 1 were dispersed and swollen in water to prepare a particle dispersion having a concentration of the gelling polymer particles of 1 mg/mL. An ultrafiltration membrane (UF membrane, manufactured by Sartorius Corporation) having a molecular weight cut-off of 10 k, 50 k or 300 k was prepared, and the prepared particle dispersion was applied onto the surface or the back surface of the porous material according to a spray coating method to form a membrane (membrane containing the gelling polymer particles) having a thickness of 260 nm. At this time, the membrane formation according to the spray coating method was repeated for a total of 6 times each interposed by a drying step. Subsequently, an ultrafiltration membrane of the same kind was laid on the formed membrane to produce various composites differing in the kind of the porous material therein.

FIG. 20 shows scanning electron microscope photographs of the surface and the back surface of the ultrafiltration membrane used. FIG. 21 shows the nitrogen permeance and the carbon dioxide permeance of each produced composite.

Also in the case where the gelling polymer particles-containing membrane was formed on the ultrafiltration membrane, the carbon dioxide permeance was higher than the nitrogen permeance, and the composite produced herein exhibited excellent selective permeability to carbon dioxide.

(c) Discussion of Pore Size of Porous Material of Polyether Sulfone

The gelling polymer particles 1 synthesized in Synthesis Example 1 were dispersed and swollen in water to prepare a particle dispersion having a concentration of the gelling polymer particles of 1 mg/mL. A porous material of polyether sulfone (PES) having a pore size of 0.1 µm, 0.22 µm or 0.45 µm was prepared, and the particle dispersion prepared above was applied onto the surface of the porous material according to a spray coating method to form a membrane (membrane containing the gelling polymer particles 1) having a thickness of 520 min. At this time, the membrane formation according to the spray coating method was repeated for a total of 12 times each interposed by a drying step.

FIG. 22 shows scanning electron microscope photographs of the surfaces of porous material used and the surfaces of the membrane thrilled.

From FIG. 22, it is known that the porous material of polyether sulfone having a pore size of less than 0.22 μm, preferably about 0.1 μm or less (for example, 0.15 μm or less) can form a good membrane with few defects.

(d) Discussion of Pore Size of Porous Material of Nitrocellulose

The gelling polymer particles 1 synthesized in Synthesis Example 1 were dispersed and swollen in water to prepare a particle dispersion having a concentration of the gelling polymer particles of 1 mg/mL. A porous material of nitrocellulose (NC) having a pore size of 0.025 μm, 0.1 μm or 0.22 μm was prepared, and the particle dispersion prepared above was applied onto the surface of the porous material according to a spray coating method to form a membrane (membrane containing the gelling polymer particles 1). At this time, the membrane formation according to the spray coating method was repeated plural times (for spray coating) each interposed by a drying step, and the thickness of the membrane was controlled by changing the coating frequency. Subsequently, a porous material of nitrocellulose having the same pore size as that of the previous porous material was laid on the formed membrane, thereby producing various composites differing in the pore size of the porous material and in the thickness of the gelling polymer particles-containing membrane therein.

FIG. 23 shows scanning electron microscope photographs of the cross sections of the porous material and the membrane and the surfaces of the membrane. In FIG. 23, the upper stage includes scanning electron microscope photographs of the cross sections of the porous material and the membrane, and the lower stage includes scanning electron microscope photographs of the surfaces of the membrane. The nitrogen permeance, the carbon dioxide permeance and the selectivity ($CO_2/N_2$) of the produced composites were measured. FIGS. 24 to 26 show a thickness dependence of the nitrogen permeance, the carbon dioxide permeance and the selectivity of each composite at the gelling polymer particles-containing membrane therein.

From FIG. 23, it is known that, also in the case of the porous material of nitrocellulose, a good membrane with few defects can be formed when the pore size is less than 0.22 μm, preferably about 0.1 μm or less (for example, 0.15 μm or less), more preferably 0.1 μm or less. From FIGS. 24 to 26, it is known that the composites using the porous material of nitrocellulose can also exhibit a high carbon dioxide permeance and a high selectivity ($CO_2/N_2$).

Discussion of Surface Treatment of Porous Material and Interlayer Formed Between Porous Material and Membrane (e) Evaluation of Composite Hydrophilized on the Surface of Porous Material The gelling polymer particles 1 synthesized in Synthesis Example 1 were dispersed and swollen, in water to prepare a particle dispersion having a concentration of the gelling polymer particles of 1 mg/mL. A porous material of ultrahigh-molecular polyethylene (UPE) hydrophilized on the surface thereof or unhydrophilized was prepared, and the particle dispersion prepared above was applied onto the surface of the porous material according to a spray coating method to form a membrane (membrane containing the gelling polymer particles). Here, the membrane formation according to the spray coating method was repeated for a total of 6 times each interposed by a drying step. Subsequently, the same porous material of ultra-high-molecular polyethylene as the underlying porous material was laid on each formed membrane, thereby producing two kinds of composites differing in the presence of absence of hydrophilization of the porous material.

FIG. 27 shows scanning electron microscope photographs of the surface of each porous material used and scanning electron microscope photographs of the surface of the formed membrane. FIGS. 28 and 29 show the nitrogen permeance, the carbon dioxide permeance and the selectivity ($CO_2/N_2$) of the produced composites, as measured at a humidifier temperature of 40° C.

As shown in FIG. 27, all membrane did not have defects. As in FIGS. 28 and 29, each composite exhibited selective permeability for carbon dioxide. Indeed, the membrane formed on the hydrophilized porous material surface was flat, and when formed into a composite, the selective permeability to carbon dioxide of the membrane was higher.

(f) Evaluation of Composite with PDMS Layer Provided Between Porous Material and Membrane The gelling polymer particles 1 synthesized in Synthesis Example 1 were dispersed and swollen in water to prepare a particle dispersion having a concentration of the gelling polymer particles of 1 mg/mL. An interlayer (PDMS layer) of polydimethylsiloxane (PDMS) was formed in a thickness of 1 μm on the surface of a porous material of polyether sulfone having a pore size of 0.1 μm or a porous material of polyvinylidene fluoride having a pore size of 0.22 μm, and onto the PDMS layer, the particle dispersion prepared above was applied according to a spray coating method to form a membrane (membrane containing the gelling polymer particles 1). At this time, the membrane formation according to the spray coating method was repeated plural times each interposed by a drying step, and the coating frequency was varied to control the thickness of the membrane to be formed. Subsequently, the same porous material as the underlying porous material was laid on each formed membrane, thereby producing various composites differing in the kind of the porous material and the thickness of the gelling polymer particles-containing membrane therein.

FIG. 30 shows scanning electron microscope photographs of the surface of the membrane formed on each porous material via the PDMS layer. The nitrogen permeance, the carbon dioxide permeance and the selectivity ($CO_2/N_2$) of each produced composite were measured. FIG. 31 shows a change with time of the permeation performance of the composite produced by forming the PDMS layer on the porous material of polyether sulfone having a pore size of 0.1 μm followed by further forming thereon a gelling polymer particles-containing membrane having a thickness of 86 nm; FIG. 32 shows a change with time of the permeation performance of the composite produced by forming the PDMS layer on the porous material of polyether sulfone having a pore size of 0.1 μm followed by further forming thereon a gelling polymer particles-containing membrane having a thickness of 130 nm; and FIG. 33 shows a change with time of the permeation performance of the composite produced by forming the PDMS layer on the porous material of polyvinylidene fluoride having a pore size of 0.22 μm followed by further forming thereon a membrane containing the gelling polymer particles 1 and having a thickness of 130 nm. For reference, FIG. 34 shows a change with time of the permeation performance of the composite produced by forming a membrane containing the gelling polymer particles 1 and having a thickness of 130 nm directly on the porous material of polyether sulfone having a pore size of 0.1 µm.

FIG. 35 shows a thickness dependence of the permeation performance of the composite produced by forming the PDMS layer on the porous material of polyether sulfone having a pore size of 0.1 µm followed by further forming thereon the membrane containing the gelling polymer particles 1, at the membrane containing the gelling polymer particles 1. For reference, FIG. 36 shows a thickness dependence of the permeation performance of a composite produced by forming a film containing the gelling polymer particles 1 and having a thickness of 130 nm directly on the porous material of polyether sulfone having a pore size of 0.1 µm, at the membrane containing the gelling polymer particles 1.

From comparison between FIGS. 31 to 33 and FIG. 34, and from comparison between FIG. 35 and FIG. 36, it is known that, by providing the PDMS layer between the porous material and the membrane, the selectivity ($CO_2/N_2$) markedly increased especially in a thin membrane range and that the selective permeability of carbon dioxide relative to nitrogen improved.

Further, a composite was produced in the same manner as that for the composite measured for the change with time in FIG. 32 (having PDMS layer) or FIG. 34 (not having PDMS layer), except that a porous material of nitrocellulose having a pore size of 0.025 µm was used as the porous material, and the nitrogen permeance, the carbon dioxide permeance and the selectivity ($CO_2/N_2$) thereof were measured. The results are shown in FIGS. 37 and 38 along with the measurement results of a composite using a porous material of PES having a pore size of 0.1 µm and a composite using a porous material of polyvinylidene fluoride having a pore size of 0.22 µm. In FIGS. 37 and 38, the bar charts indicate a nitrogen permeance and a carbon dioxide permeance, and the round black indicates a selectivity ($CO_2/N_2$). From comparison between FIG. 37 and FIG. 38, it is known that, by providing the PDMS layer, the carbon dioxide permeance markedly increased.

(g) Evaluation of Composite Provided with Layer of Silica Porous Fine Particles Between Porous Material and Membrane Mesoporous silica fine particles (manufactured by Sigma Aldrich Corporation: mean particle size 200 nm, pore size 4 nm) were dispersed in an aqueous NaOH solution having a pH of 11 in concentration of 1 mg/mL to prepare a silica dispersion. The silica dispersion was applied onto the surface of a porous material of polyether sulfone having a pore size of 0.1 µm according to a spray coating method to form a layer of silica porous fine particles. The formation of the layer of silica porous fine particles according to the spray coating method was repeated for a total of 12 times each interposed by a drying step. The gelling polymer particles 1 synthesized in Synthesis Example 1 were dispersed and swollen in water to prepare a particle dispersion having a concentration of the gelling polymer particles of 1 mg/mL. The prepared particle dispersion was applied onto the layer of silica porous fine particles according to a spray coating method to form a membrane (membrane containing the gelling polymer particles 1). Here, the membrane formation according to the spray coating method was repeated for a total of 6 times each interposed by a drying step.

FIG. 39 shows scanning electron microscope photographs of the layer of silica porous fine particles and the gelling polymer particles-containing membrane. In FIG. 39, the left-side photograph is a scanning electron microscope photograph of the cross section of the layer of silica porous fine particles and the gelling polymer particles-containing membrane, and the right-side photograph is a scanning electron microscope photograph of the surface of the gelling polymer particles-containing membrane. The produced composite was measured for a change with time of the carbon dioxide permeance, the nitrogen permeance and the selectivity ($CO_2/N_2$). The measurement results are shown in FIG. 40. For reference, a change with time of the permeation performance of a composite produced by forming a membrane containing gelling polymer particles 1 and having a thickness of 130 nm directly on a porous membrane of polyether sulfone having a pore size of 0.1 µm is shown in FIG. 41, and a change with time of the permeation performance of a composite (composite not having a layer containing gelling polymer particles 1) produced by forming a layer of silica porous fine particles on a porous material of polyether sulfone having a pore size of 0.1 µm followed by further laying the porous material directly on the layer is shown in FIG. 42.

From comparison between FIGS. 40 and 42, it is known that, by providing the layer of silica porous fine particles between the porous material and the membrane, the carbon dioxide permeance and the selectivity ($CO_2/N_2$) increase and the selective permeability to carbon dioxide improves more.

Evaluation of Selective Permeability to Carbon Dioxide in the Ease Where the Supply Gas is a Mixed Gas of Methane and Carbon Dioxide The gelling polymer particles 1 synthesized in Synthesis Example 1 were dispersed and swollen in water to prepare a particle dispersion having a concentration of the gelling polymer particles of 1 mg/mL. The prepared particle dispersion was applied onto the back surface of nitrocellulose having a pore size of 0.1 µm according to a spray coating method to form a membrane (gelling polymer particles-containing membrane) having a thickness of 86 nm or 260 nm, and nitrocellulose having a pore size of 0.1 µm was laid thereon to construct a composite. Here, the membrane formation according to the spray coating method was repeated for a total of 2 or 6 times each interposed by a drying step.

A mixed gas of methane and carbon dioxide was supplied to the produced composite, and the carbon dioxide permeation performance (carbon dioxide permeance, methane permeance and selectivity ($CO_2/N_2$)) through the composite was measured. For the permeation performance measurement, the gas permeation performance measuring device shown in FIG. 3 was used, in which the nitrogen supply source was changed to a methane supply source, the relative humidity of the supply gas was 94% and the relative humidity of the sweep gas was 85%.

The carbon dioxide permeance was 66 GPU through the membrane having a thickness of 86 nm and was 43 GPU through the membrane having a thickness of 260 nm; the methane permeance was 9.2 GPU through the membrane having a thickness of 86 nm and was 3.1 GPU through the membrane having a thickness of 260 nm; and the selectivity ($CO_2/N_2$) was 7 through the membrane having a thickness of 86 nm and was 13 through the membrane having a thickness of 260 nm. The results confirm that the produced composite functions as a gas separation material for separating carbon dioxide from methane.

Evaluation of Water Permeance

The gelling polymer particles 1 synthesized in Synthesis Example 1 were dispersed and swollen in water to prepare a particle dispersion having a concentration of the gelling polymer particles of 1 mg/mL. The prepared particle dispersion was applied onto the back surface of nitrocellulose having a pore size of 0.025 µm according to a spray coating method to form a membrane (gelling polymer particles-containing membrane) having a thickness of 130 nm or 260 nm, and nitrocellulose having a pore size of 0.1 µm was laid thereon to construct a composite. Here, the membrane formation according to the spray coating method was repeated for a total of 3 or 6 times each interposed by a drying step.

A mixture prepared by mixing any two of water, nitrogen and carbon dioxide was applied to the produced composite, and the permeation performance to these Of the composite was measured. The results are shown in FIG. 43. For the measurement of the mixed gas permeation performance, the gas permeation performance measuring device shown in FIG. 3 was used, in which the flow rate of nitrogen and that of carbon dioxide were changed to 90 mL/min or 10 mL/min, respectively, or to 180 mL/min or 20 mL/min, respectively, the flow rate of the sweep gas (helium gas) was changed to 50 mL/min, 100 mL/min or 200 mL/min, and the humidifier temperature was 40° C. For the measurement of water permeation performance, the water permeation flow rate was measured through gas chromatography.

The produced composite exhibited selective permeability to water of thousands of times and hundreds of times as compared with selective permeability to nitrogen and carbon dioxide, respectively. It is known that the gelling polymer particles-containing membrane produced here can function as a water selective permeation membrane. In addition, it is presumed that, when a membrane is formed using gelling polymer particles having a carboxyl group or a sulfate group in place of an amino group, gelling polymer particles having both these two functional groups or gelling polymer particles with salt formation, the carbon dioxide permeation performance may be lowered further and at the same time the water permeation performance may be increased.

REFERENCE SIGNS LIST

1a Composite Sample
11, 12 Porous Material
13 Porous Carrier
14 Gelling Polymer Particles-Containing Membrane
21 Thermostat Bath
22 Supply Gas Delivery Line
23 Sweep Gas Delivery Line
24 Gas Chromatograph
25 Nitrogen Supply Source
26 Carbon Dioxide Supply Source
27, 29 Humidifier
28 Helium Gas Supply Source

The invention claimed is:

1. A composite having a porous carrier and a monolayer membrane containing gelling polymer particles having at least one of a basic functional group and an acidic functional group, wherein:
    the gelling polymer particles fill up the surface pores of the porous carrier,
    the monolayer membrane has a thickness of less than 5 µm, and
    the surface pores of the porous carrier have an open pore diameter of less than 0.5 µm.

2. The monolayer membrane composite according to claim 1, wherein the gelling polymer particles is constituted by a polymer of a monomer component containing a monomer having an amino group and a monomer having a hydrophobic group, and the molar ratio of the amino group-having monomer to the hydrophobic group-having monomer is 1/95 to 95/5.

3. The composite according to claim 1, wherein the amino group-having monomer is an N-(aminoalkyl)methacrylamide and the hydrophobic group-having monomer is an N-alkylacrylamide.

4. The composite according to claim 1, wherein the gelling polymer particles are particles of a polymer compound infiltrated with a basic molecule.

5. The composite according to claim 1, containing gelling polymer particles having an acidic functional group and gelling polymer particles having a basic functional group.

6. The composite according to claim 1, wherein among the gelling polymer particles, a crosslinked structure is formed between at least a part of the gelling polymer particles.

7. The composite according to claim 1, wherein the monolayer membrane contains a membrane stabilizer containing a polyvinylamine or a polyvinylamine derivative.

8. The composite according to claim 1, containing a titanium crosslinking agent.

9. The composite according to claim 1, wherein the pore diameter of the surface pores gradually reduces toward the inside of the porous carrier.

10. The composite according to claim 9, wherein the porous carrier has an OH group or a COOH group in the surface thereof or the surface of the porous carrier is hydrophilized.

11. The composite according to claim 9, wherein the mean square roughness of the composite surface is 5 µm or less.

12. A gas separation material having the composite of claim 9.

13. The gas separation material according to claim 12, wherein the carbon dioxide permeance at 40° C. is 10 GPU or more and the nitrogen permeance at 40° C. is 100 GPU or less.

14. The gas separation material according to claim 12, wherein a plurality of the composites are connected in series.

* * * * *